US009182844B2

(12) United States Patent
Misaki

(10) Patent No.: US 9,182,844 B2
(45) Date of Patent: Nov. 10, 2015

(54) TOUCH PANEL, DISPLAY DEVICE PROVIDED WITH TOUCH PANEL, AND METHOD FOR MANUFACTURING TOUCH PANEL

(71) Applicant: Sharp Kabushiki Kaisha, Osaka (JP)

(72) Inventor: Katsunori Misaki, Yonago (JP)

(73) Assignee: SHARP KABUSHIKI KAISHA, Osaka (JP)

(*) Notice: Subject to any disclaimer, the term of this patent is extended or adjusted under 35 U.S.C. 154(b) by 59 days.

(21) Appl. No.: 14/348,949

(22) PCT Filed: Sep. 27, 2012

(86) PCT No.: PCT/JP2012/074821
§ 371 (c)(1),
(2) Date: Apr. 1, 2014

(87) PCT Pub. No.: WO2013/051443
PCT Pub. Date: Apr. 11, 2013

(65) Prior Publication Data
US 2014/0240624 A1 Aug. 28, 2014

(30) Foreign Application Priority Data
Oct. 7, 2011 (JP) ................................. 2011-222514

(51) Int. Cl.
G06F 3/041 (2006.01)
G06F 3/044 (2006.01)

(52) U.S. Cl.
CPC ............. *G06F 3/0412* (2013.01); *G06F 3/044* (2013.01); *G06F 2203/04103* (2013.01); *G06F 2203/04111* (2013.01)

(58) Field of Classification Search
CPC ............ G06F 2203/04111; G06F 2203/04112; G06F 2203/04113; G06F 3/041; G06F 3/044
See application file for complete search history.

(56) References Cited

U.S. PATENT DOCUMENTS

2010/0073310 A1* 3/2010 Liang et al. .................... 345/173
2011/0096018 A1* 4/2011 Lee et al. ....................... 345/174
2011/0227840 A1 9/2011 Sim et al.

FOREIGN PATENT DOCUMENTS

JP 2010-140370 A 6/2010
JP 2011-192252 A 9/2011

* cited by examiner

Primary Examiner — Kevin M Nguyen
(74) Attorney, Agent, or Firm — Chen Yoshimura LLP

(57) ABSTRACT

A configuration of a touch panel in which an electrode pattern is not readily visible is attained in the present invention. A touch panel is provided with an insulating substrate, first island-shaped electrodes formed on the substrate and arranged in one direction, second island-shaped electrodes formed on the substrate and arranged in a direction intersecting the direction in which the first island-shaped electrodes are arranged, a first connecting member for connecting the first island-shaped electrodes, a metallic film formed on the first connecting member, an insulating film formed so as to completely cover the metallic film, and a second connecting member for connecting the second island-shaped electrodes over the insulating film. The first island-shaped electrodes, the second island-shaped electrodes, the first connecting member, and the second connecting member are formed using a transparent conductive film.

10 Claims, 30 Drawing Sheets

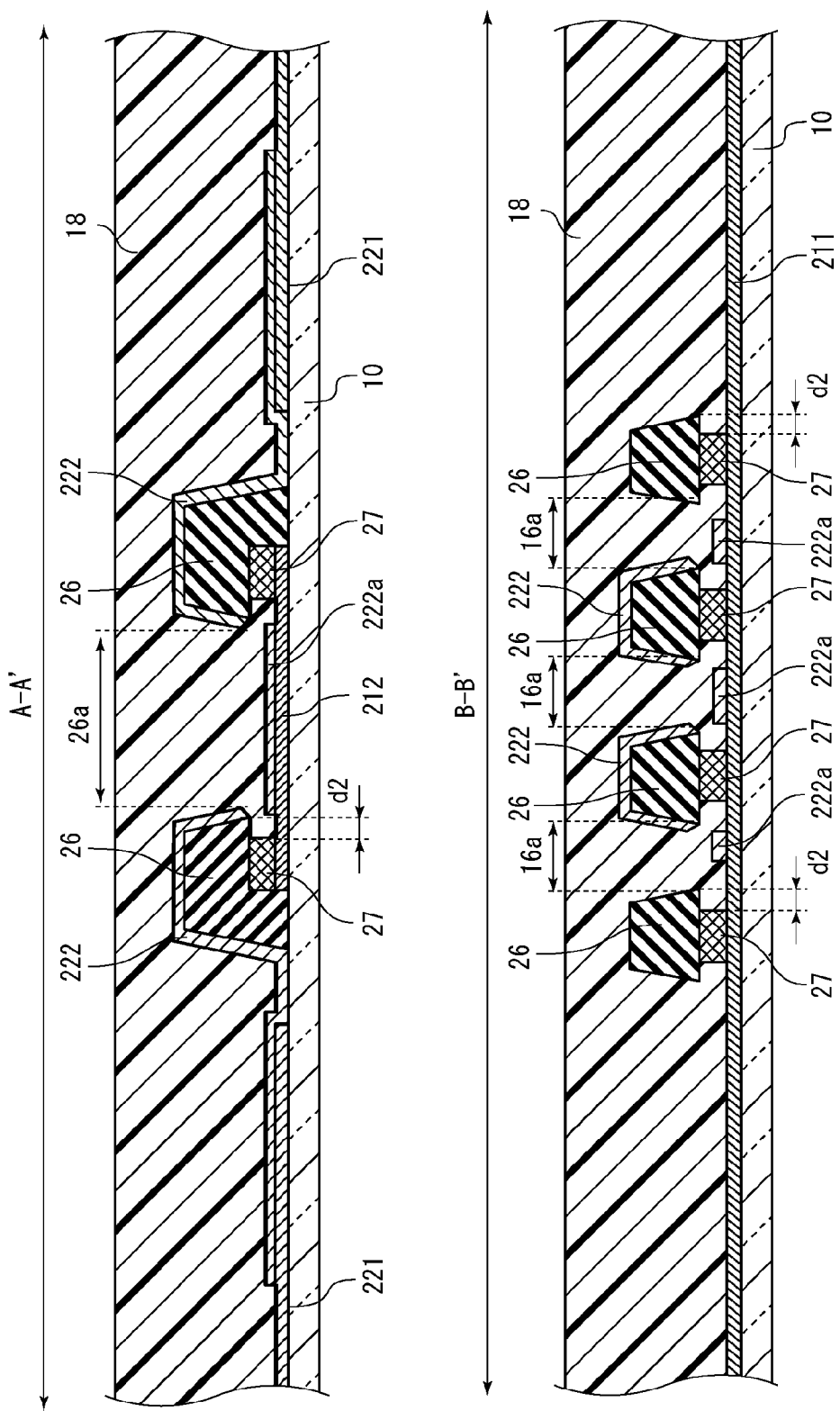

TOUCH PANEL, DISPLAY DEVICE PROVIDED WITH TOUCH PANEL, AND METHOD FOR MANUFACTURING TOUCH PANEL

TECHNICAL FIELD

The present invention relates to a touch panel, a display device equipped with the touch panel, and a method of manufacturing the touch panel, and more specifically to a capacitive touch panel, a display device equipped with the touch panel, and a method of manufacturing the touch panel.

BACKGROUND ART

Capacitive type touch panels have recently become popular due having a high degree of practical use such as being capable of multi-position detection.

Japanese Patent Application Laid-Open Publication No. 2010-140370 discloses a capacitive touch panel having electrode patterns including a plurality of first electrodes and second electrodes formed on the same surface on a transparent substrate. In this touch panel, the plurality of first electrodes aligned in the row direction are connected to each other in the row direction by first conductive members, and the plurality of second electrodes aligned in the column direction are connected to each other in the column direction by second conductive members. In the intersections between the first conductive members and the second conductive members, interlayer insulating layers are formed.

Also, in the document above, a protective sheet is bonded onto the electrode patterns through an adhesive layer such as an optical adhesive, and thus, the intersection between the first conductive member and the second conductive member is made so as not be readily seen.

SUMMARY OF THE INVENTION

Because the touch panel is in use while stacked onto a display device, it is preferable that the electrode patterns be difficult to see by the user. In the touch panel disclosed in Japanese Patent Application Laid-Open Publication No. 2010-140370, the first electrodes and second electrodes are formed on the same plane, and thus, the difference in reflectance between the first electrodes and second electrodes is small, and the electrode patterns are difficult to see.

The document above discloses the following manufacturing method. First, the first conductive members are formed on a transparent substrate. Next, an interlayer insulating layer is formed so as to cover portions of the first conductive members. Then, the first electrodes, second electrodes, and second conductive members are formed simultaneously.

According to this method, at least three patterning steps including the patterning step to form the first conductive members; the patterning step to form the interlayer insulating layer; and the patterning step to form the first electrodes, second electrodes, and second conductive members are necessarily.

If, in addition to this, wiring lines and a protective film are to be formed, then an additional two patterning steps are necessary, bringing the total number of necessary patterning steps to five. In order to reduce the number of steps, one method is to form the first conductive members and the wiring lines of the same material simultaneously, for example.

However, the electrode patterns (first electrodes, second electrodes, first conductive members, and second conductive members) are formed in a location that can be seen by the user, and are thus it is preferable that they be formed of a transparent material (transparent conductive film, for example), and that they be thin (10 to 50 nm, for example). On the other hand, the wiring lines are typically formed in a location not seen by the user, and thus, transparency is not necessary. Thus, the wiring lines are generally made of a metal film or the like with a low electrical resistance.

Thus, if the first conductive members and the wiring lines are to be formed of the same material simultaneously, the following problems occur. If the first conductive members and the wiring lines are both made of a metal film, then because of the high reflectance of the metal film, the first conductive members are seen by the user with ease, which results in a decrease in display quality in the touch panel. On the other hand, if the first conductive members and wiring lines are both made of the transparent conductive film, then the electrical resistance of the wiring lines increases, and the sensitivity of the touch panel decreases.

Also, bonding a protective sheet through an adhesive layer such as an optical adhesive on the electrode patterns as in the touch panel disclosed in Japanese Patent Application Laid-Open Publication No. 2010-140370 is not preferable due to the resulting decrease in light transmittance and an increase in the number of steps during manufacturing.

An object of the present invention is to attain a configuration of a touch panel in which the electrode patterns are difficult to see.

The touch panel disclosed herein includes: an insulating substrate; first island-shaped electrodes formed on the substrate and arranged along one direction; second island-shaped electrodes formed on the substrate and arranged along a direction that intersects with the one direction along which the first island-shaped electrodes are disposed; a first connecting member that connects the first island-shaped electrodes; a metal film formed on the first connecting member; an insulating film formed so as to cover an entirety of the metal film; and a second connecting member connecting the second island-shaped electrodes over the insulating film. The first island-shaped electrodes, the second island-shaped electrodes, the first connecting member, and the second connecting member are made of transparent conductive films.

According to the present invention, a touch panel with difficult to see electrode patterns can be attained.

BRIEF DESCRIPTION OF THE DRAWINGS

FIG. 23 shows cross-sectional views of FIG. 22 along the lines A-A' and B-B'.

DETAILED DESCRIPTION OF EMBODIMENTS

Figure 1:
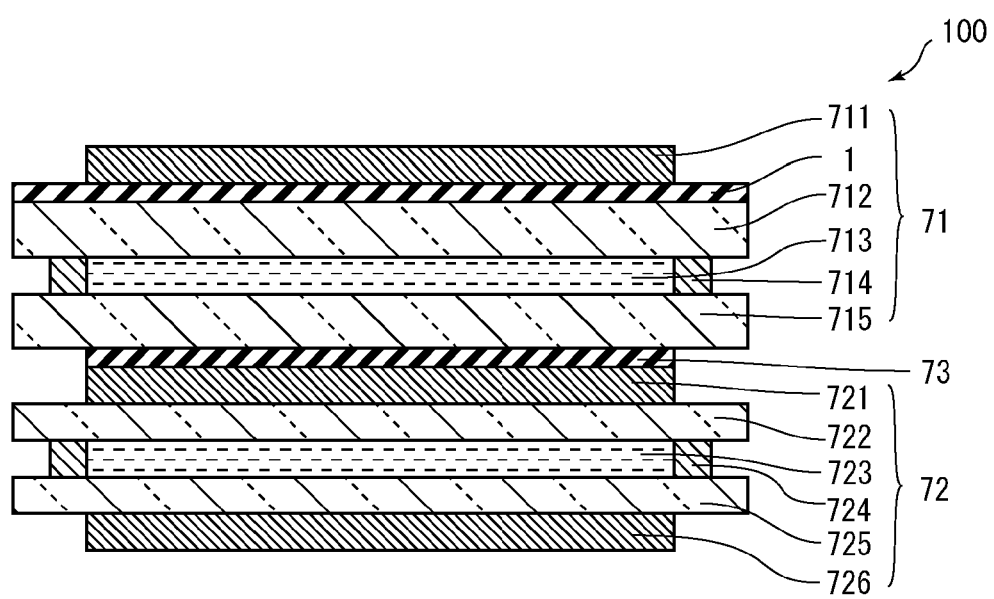
FIG. 1 is a cross-sectional view of a schematic configuration of a display device with a touch panel according to one embodiment of the present invention.

A touch panel according to an embodiment of the present invention includes: an insulating substrate; first island-shaped electrodes formed on the substrate and arranged along one direction; second island-shaped electrodes formed on the substrate and arranged along a direction that intersects with the one direction along which the first island-shaped electrodes are disposed; a first connecting member that connects the first island-shaped electrodes; a metal film formed on the first connecting member; an insulating film formed so as to cover an entirety of the metal film; and a second connecting member connecting the second island-shaped electrodes over the insulating film. The first island-shaped electrodes, the second island-shaped electrodes, the first connecting member, and the second connecting member are made of transparent conductive films (first configuration).

According to this configuration, the metal film is formed only over the first connecting member where it is covered by an insulating film. Thus, the area of the metal can be made small. Therefore, the electrode patterns can be made difficult to see.

In the first configuration, it is preferable that an edge of the metal film be located further to an inner side of the insulating film than an edge of the insulating film (second configuration).

According to this configuration, the area of the metal film can be made smaller. Thus, the electrode patterns can be made more difficult to see. .

In the second configuration, it is preferable that an edge of the metal film be located further to an inner side of the insulating film by at least 0.1 μm than an edge of the insulating film (third configuration).

In any of the first to third configurations, it is preferable that the insulating film have an opening (fourth configuration).

According to this configuration, the area of the metal film can be made smaller.

In the fourth configuration, the metal film may be greater in thickness than the second connecting member, and the second connecting member may have regions separated by the opening in the insulating film (fifth configuration).

In any of the first to fifth configurations, it is preferable that the insulating film be made of a black resin (sixth configuration).

According to this configuration, a black resin covers the metal film, thus reducing the reflection of light from the metal film. As a result, the electrode patterns can be made more difficult to see.

In any of the first to sixth configurations, it is preferable that the metal film include layers of molybdenum-niobium, aluminum, and molybdenum-niobium (seventh configuration).

In any of the first to seventh configurations, wiring lines made of the same material as the metal film may be further included (eighth configuration).

According to this configuration, the metal film and the wiring lines can be formed at the same time, and thus, the manufacturing process can be simplified.

A touch panel-equipped display device according to an embodiment of the present invention includes: a display device that can display images; and the touch panel of any one of the first to eighth configurations (first configuration of touch panel-equipped display device).

A manufacturing method for a touch panel according to an embodiment of the present invention includes: forming a first transparent conductive film on an insulating substrate; forming a metal film on the first transparent conductive film; patterning the first transparent conductive film and the metal film; forming an insulating film so as to cover respective portions of the substrate and the metal film; etching at least portions of the metal film not covered by the insulating film; forming a second transparent conductive film so as to cover the substrate, the first transparent conductive film, the metal film, and the insulating film; and patterning the second transparent conductive film (first aspect of a manufacturing method).

<Embodiments>

Embodiments of the present invention will be described in detail below with reference to the drawings. Portions in the drawings that are the same or similar are assigned the same reference characters and descriptions thereof will not be repeated. For ease of description, drawings referred to below show simplified or schematic configurations, and some of the components are omitted. Components shown in the drawings are not necessarily to scale.

<Overall Configuration>

FIG. 1 is a cross-sectional view showing a schematic configuration of a display device 100 equipped with a touch panel 1 according to an embodiment of the present invention. The display device 100 equipped with the touch panel includes a switch liquid crystal panel 71 and a liquid crystal display panel 72. The switch liquid crystal panel 71 and the liquid crystal display panel 72 are bonded together by an adhesive member 73.

The switch liquid crystal panel 71 includes a polarizing plate 711, the touch panel 1, an active matrix substrate 712, liquid crystal 713, a sealing member 714, and an opposite substrate 715.

The liquid crystal 713 is sandwiched between the active matrix substrate 712 and the opposite substrate 715 disposed opposite thereto, and is sealed in by the sealing member 714 formed in the periphery of the substrates. The active matrix substrate 712 has stripe-shaped transparent electrodes and TFTs (thin film transistors) formed thereon. The opposite substrate 715 has a transparent electrode formed on the entire surface thereof.

The front surface of the active matrix substrate 712 has a touch panel 1 bonded thereto. The touch panel 1, which will be described in detail later, includes an insulating substrate and electrodes formed in a grid pattern. The touch panel 1 detects a position of a finger or the like based on changes in capacitance formed between these electrodes and the finger or the like that is proximal to the touch panel 1. The touch panel 1 is a so-called capacitive touch panel.

The front surface of the touch panel 1 has bonded thereto the polarizing plate 711.

The liquid crystal display panel 72 includes a polarizing plate 721, a color filter substrate 722, liquid crystal 723, a sealing member 724, an active matrix substrate 725, and a polarizing plate 726.

The liquid crystal 723 is sandwiched between the color filter substrate 722 and the active matrix substrate 725 disposed opposite thereto, and is sealed in by the sealing member 724 formed in the periphery of the substrates. The active matrix substrate 725 has pixel electrodes and TFTs formed in a matrix. On the color filter substrate 722, a common electrode formed on the entire surface thereof, and color filters disposed in positions corresponding to the respective pixel electrodes on the active matrix substrate 725 are formed.

The front surface of the color filter substrate 722 has bonded thereto the polarizing plate 721. The rear surface of the active matrix substrate 725 has bonded thereto the polarizing plate 726.

In the liquid crystal display panel 72, the orientation of the liquid crystal 723 is changed over any of the pixel electrodes by controlling the TFTs formed on the active matrix substrate 725. In this manner, the liquid crystal display panel 72 can display any image.

The switch liquid crystal panel 71 can be switched between 2-dimensional display mode and 3-dimensional display mode.

In 2-dimensional display mode, the liquid crystal 713 of the switch liquid crystal panel 71 is oriented evenly by alignment films formed on the active matrix substrate 712 and the opposite substrate 715. As a result, the image displayed in the liquid crystal display panel 72 is displayed as is.

In 3-dimensional display mode, the switch liquid crystal panel 71 controls the TFTs on the active matrix substrate 712 and changes the alignment of the liquid crystal 713 at a set interval. The liquid crystal 713 functions as a lens due to the difference in index of refraction resulting from the change in orientation. Based on this gap, images shot from multiple angles are displayed in a stripe fashion in the liquid crystal display panel 72. As a result, these images are separated by the liquid crystal 713. If the display device 100 with a touch panel is viewed from an optimal position, different images are seen by the left and right eyes. In other words, the display device 100 with a touch panel performs a so-called parallax 3-dimensional display during 3-dimensional display mode.

The schematic configuration of the display device 100 with a touch panel according to the present embodiment has been described above. In the display device 100 with a touch panel, the touch panel 1 is a portion of the switch liquid crystal panel 71. The touch panel 1 may alternatively be a portion of the liquid crystal display panel 72. The touch panel 1 may be bonded onto the front surface of the color filter substrate 722 of the liquid crystal display panel 72, for example. Also, a so-called out-cell configuration may be used in which the touch panel 1 is bonded onto the front surface of the polarizing plate 711 or 721.

<Configuration of Touch Panel>

The configuration of the touch panel 1 will be described in detail below.

<Embodiment 1>

Figure 2:
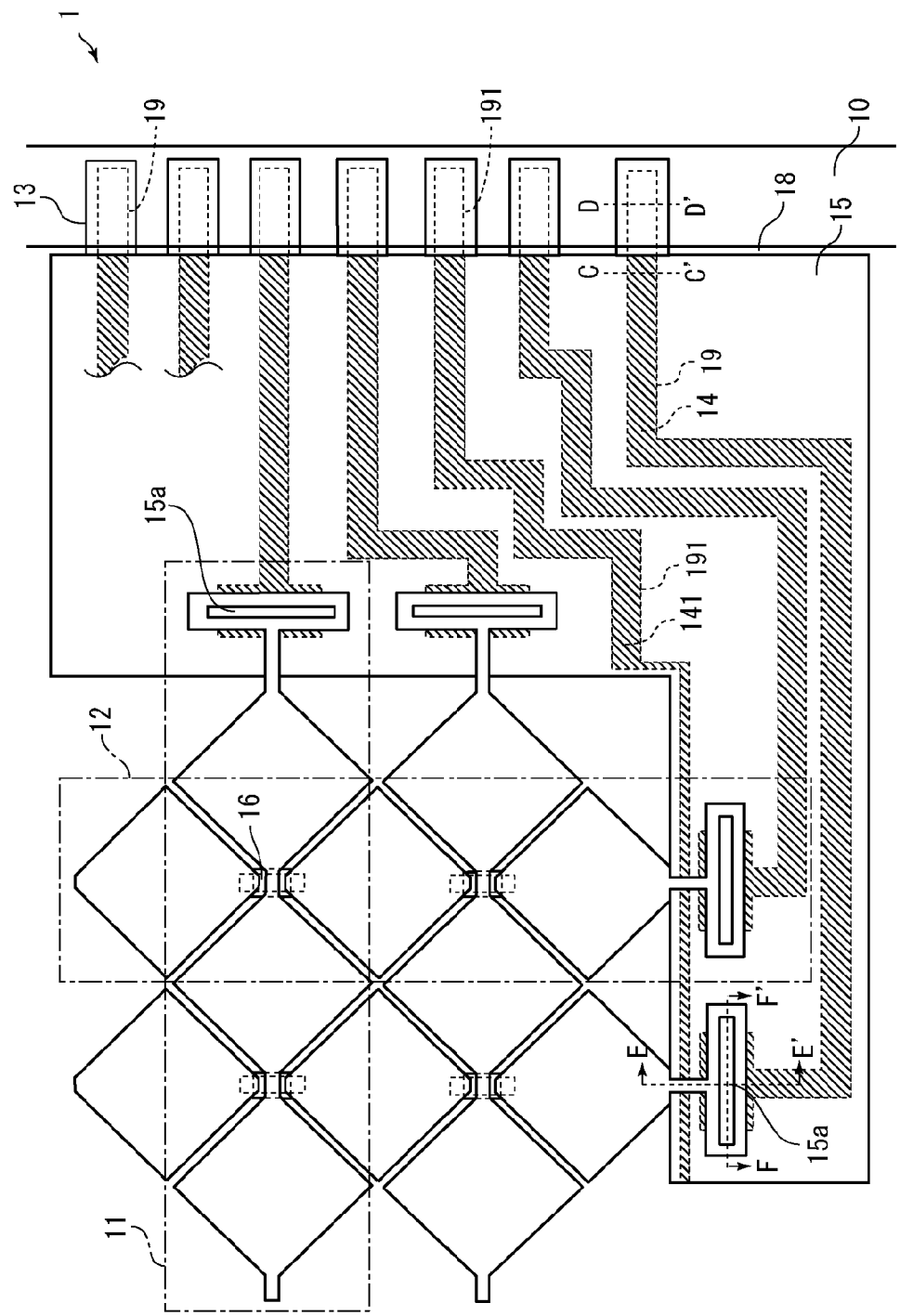
FIG. 2 is a plan view that shows a schematic configuration of a touch panel according to Embodiment 1 of the present invention.
Figure 3:
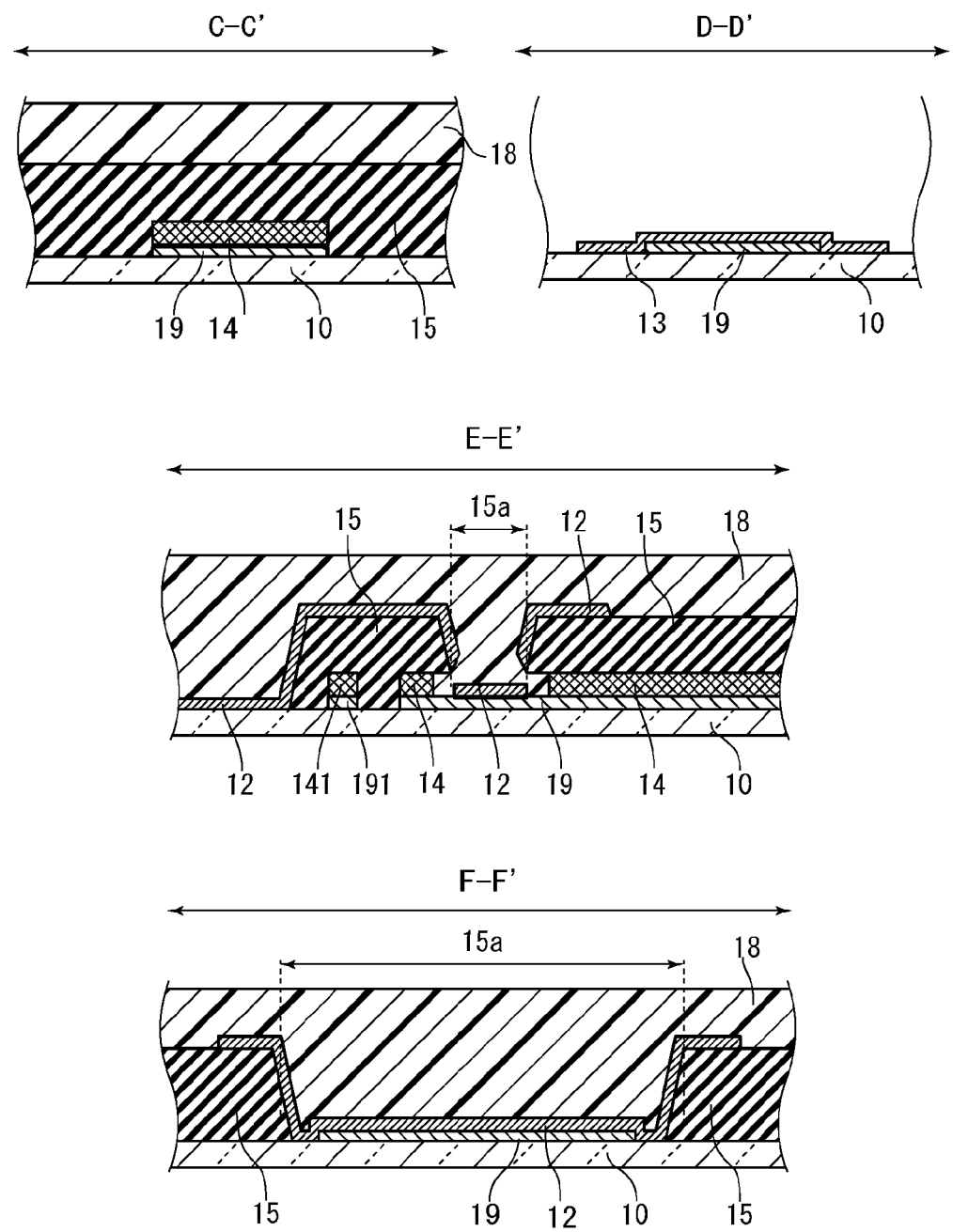
FIG. 3 shows cross-sectional views of FIG. 2 along the lines C-C', D-D', E-E', and F-F'.

FIG. 2 is a plan view that shows a schematic configuration of a touch panel 1 according to Embodiment 1 of the present invention. FIG. 3 shows cross-sectional views of FIG. 2 along the lines C-C', D-D', E-E', and F-F'. The touch panel 1 includes an insulating substrate 10, X electrodes 11, Y electrodes 12, terminals 13, wiring lines 14, a ground wiring line 141, insulating films 15 and 16, a protective film 18, and conductive films 19 and 191. In FIG. 2, the wiring lines 14 and the ground wiring line 141 are depicted with a hatching pattern for ease of viewing.

As shown in FIG. 2, the plurality of X electrodes 11 and the plurality of Y electrodes 12 intersect each other perpendicularly and are aligned with a fixed gap therebetween. In portions where the X electrodes 11 and the Y electrodes 12 intersect, insulating films 16 that insulate the X electrodes 11 from the Y electrodes 12 are provided.

Figure 4:
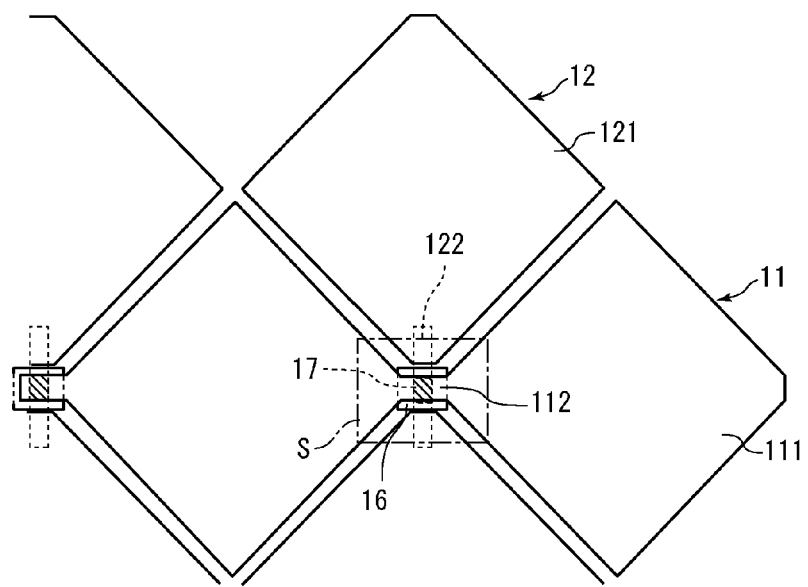
FIG. 4 shows a magnified view of the vicinity of X electrodes and Y electrodes from a configuration of the touch panel according to Embodiment 1 of the present invention.
Figure 5:
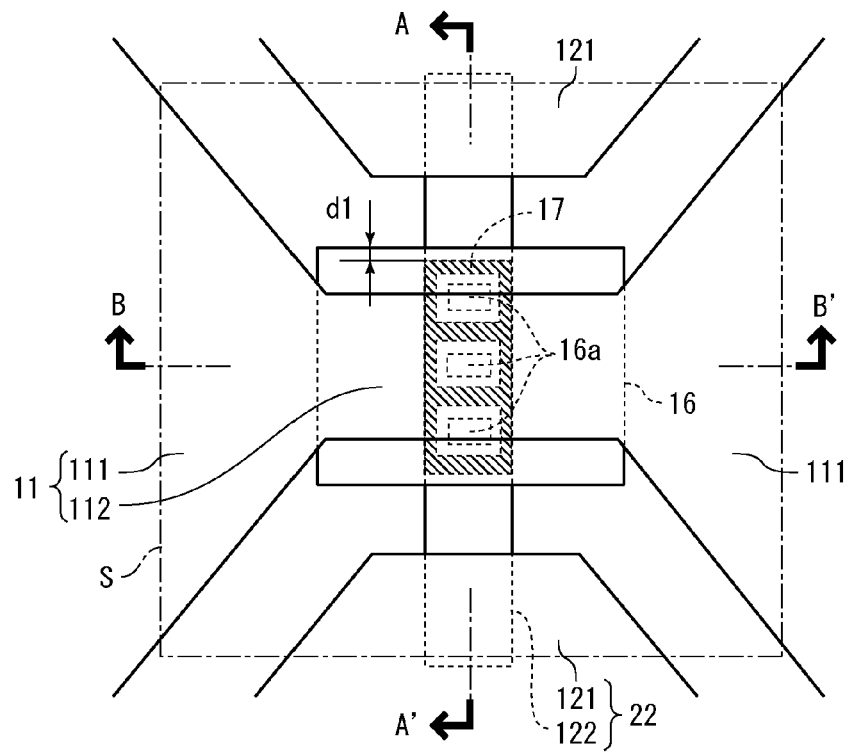
FIG. 5 shows a further magnified view of a portion where an X electrode and a Y electrode intersect (rectangular region S in FIG. 4).

Although not shown in FIG. 2, in the portions where the X electrodes 11 and the Y electrodes 12 intersect, a metal film 17 is formed (refer to FIGS. 4, 5, and the like). Details will be described later.

The wiring lines 14 and the ground wiring line 141 are formed around the area where the X electrodes 11 and Y electrodes 12 are formed. In the same locations as the wiring lines 14 and the ground wiring line 141, conductive films 19 and 191 having the same shapes as the respective wiring lines are formed towards the substrate 10. In other words, the wiring lines 14 and the ground wiring line 141 are layered with the conductive films 19 and 191.

The wiring lines 14 and the ground wiring line 141 are covered by the insulating film 15. The insulating film 15 protects the wiring lines 14 and the ground wiring line 141 from processes such as etching during the manufacturing process of the touch panel 1, thereby improving the reliability of the wiring lines 14 and the ground wiring line 141.

The insulating film 15 has formed therein contact holes 15a. The X electrodes 11, the Y electrodes 12, and the wiring lines 14 are connected through the contact holes 15a.

As shown in FIG. 3, the wiring lines 14 are not formed in portions overlapping the contact holes 15a. In the cross-sectional view along the line E-E', the thickness of the wiring lines 14 results in step shapes being formed. Because of the step shapes, the Y electrodes 12 are cut off, and the Y electrodes 12 and the conductive films 19 are not in contact in the cross-section along the line E-E'. On the other hand, in the cross-section along the line F-F', the opening of the contact hole 15a is larger than the width of the wiring line 14, and thus, there are no steps formed as a result of the wiring lines 14. Thus, the Y electrode 12 and the conductive film 19 are in contact in the cross-section along the line F-F'. As a result, the Y electrodes 12, the conductive films 19, and the wiring lines 14 are electrically connected to each other. This similarly applies to the X electrodes 11, the conductive films 19, and the wiring lines 14.

The conductive films 19 and 191 in contact with the wiring lines 14 and the ground wiring line 141 are drawn to the outside of the insulating film 15. The terminals 13 are formed on the conductive films 19 and 191 drawn to the outside of the insulating film 15.

With this configuration, the X electrodes 11, the wiring lines 14, the conductive films 19, and the terminals 13 are electrically connected to each other. Similarly, the Y electrodes 12, the wiring lines 14, the conductive films 19, and the terminals 13 are electrically connected to each other.

The ground wiring line 141 is connected to a terminal 13, but is connected to neither the X electrodes 11 nor the Y electrodes 12. The ground wiring line 141 functions as a shield to prevent interference from electromagnetic waves.

The protective film 18 is formed so as to cover the X electrodes 11, the Y electrodes 12, the wiring lines 14, the ground wiring line 141, and the insulating films 15 and 16. The protective film 18 also covers a portion of the substrate 10 and portions of the terminals 13. As shown in FIG. 2, portions of the terminals 13 are exposed without being covered by the protective film 18. The terminals 13 are connected to driver circuits and the like through an FPC (flexible printed circuit) or the like.

Figure 6:
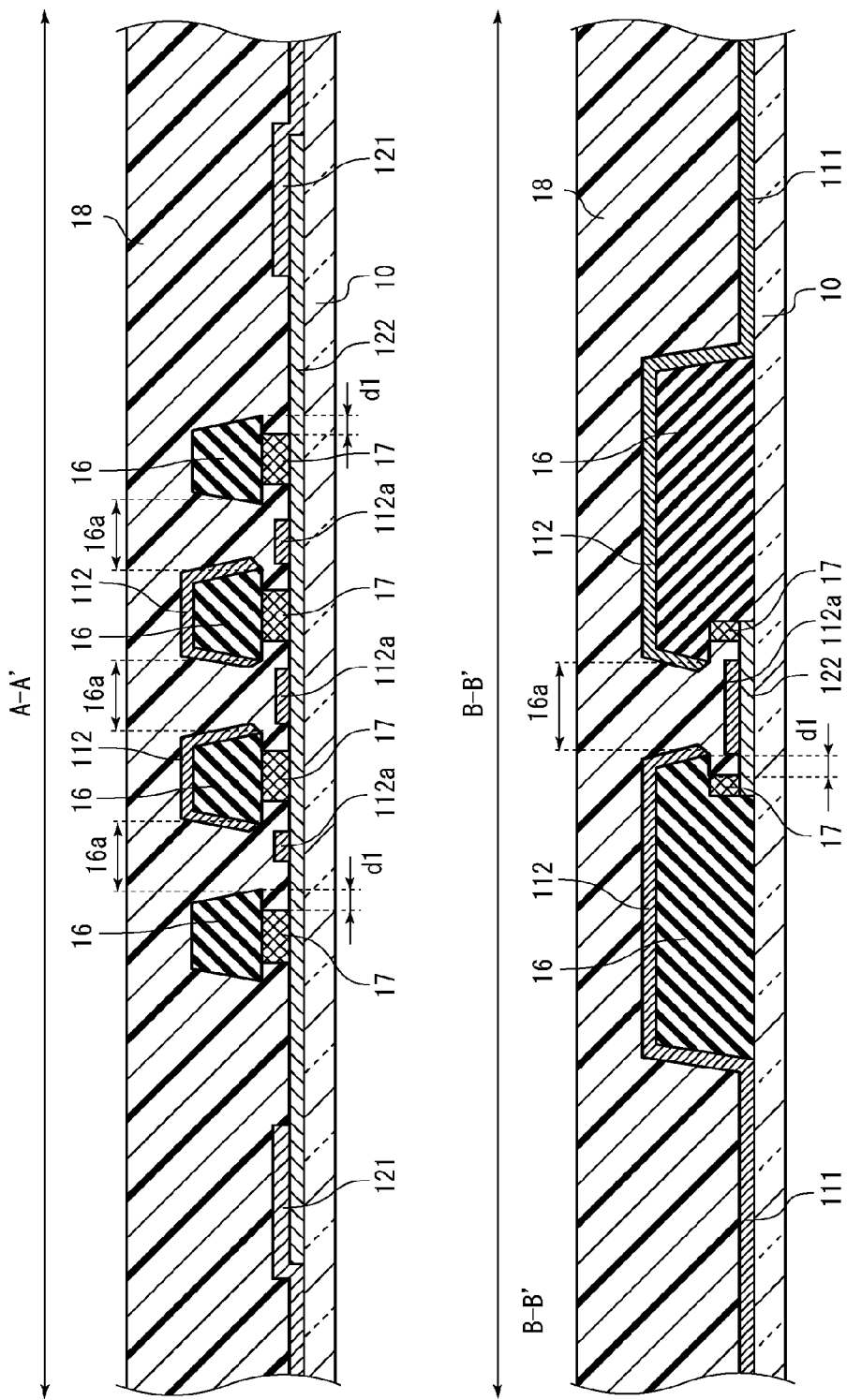
FIG. 6 shows cross-sectional views of FIG. 5 along the lines A-A' and B-B'.

FIG. 4 shows a magnified view of a vicinity of an X electrode 11 and a Y electrode 12 from the configuration of the touch panel 1. FIG. 5 shows a further magnified view of a portion where the X electrode 11 and the Y electrode 12 intersect (rectangular region S in FIG. 4). FIG. 6 shows cross-sectional views of FIG. 5 along the lines A-A' and B-B'. In FIGS. 4 and 5, the metal film 17 is schematically shown with a hatching pattern.

As shown in FIG. 4, the X electrodes 11 include a plurality of island-shaped electrodes 111 and connecting members 112 connecting adjacent island-shaped electrodes 111. The Y electrodes 12 include a plurality of island-shaped electrodes 121, and connecting members 122 that connect adjacent island-shaped electrodes 121.

As shown in FIG. 5, where the connecting member 112 of the X electrode 11 and the connecting member 122 of the Y electrode 12 intersect, an insulating film 16 is formed therebetween. Also, a metal film 17 is formed where the connecting member 122 of the Y electrode 12 and the insulating film 16 overlap in a plan view. More specifically, an edge face of the metal film 17 is further to the inside than an edge face of the insulating film 16 by a length d1.

As shown in FIG. 6, the metal film 17 is formed over the connecting member 122 and under the insulating film 16.

The insulating film 16 has formed therein a plurality of openings 16a. The metal film 17 is not formed in portions corresponding to the opening 16a. In other words, the opening 16a of the insulating film 16 also penetrates the metal film 17. More specifically, the size of each of the openings in the metal film 17 is greater than the size of each of the openings 16a of the insulating film 16. As shown in FIG. 6, an inner wall face of the opening in the metal film 17 is further to the outside than an inner wall face of the opening 16a of the insulating film 16 by the length d1.

The connecting members 112 of the X electrodes 11 connect the island-shaped electrodes 111 to each other over the insulating film 16. At this time, the connecting member 112 is also formed to overlap the opening 16a of the insulating film 16. However, as previously mentioned, the metal film 17 is not formed in portions corresponding to the opening 16a. Thus, as shown in FIG. 6, the thickness of the metal film 17 results in a step being formed in this location. This step causes the connecting member 112 to be divided. In FIG. 6, the portion of the connecting member 112 formed in the opening 16a and separated from the rest of the connecting member 112 is assigned the reference character 112a. Also, the size of each of the openings in the metal film 17 is greater than the size of each of the openings 16a of the insulating film 16. Thus, the connecting member 112 and the metal film 17 do not come into contact. As a result of such configuration, the X electrode 11 and the Y electrode 12 are not electrically connected through the opening 16a, and are thus insulated from each other.

In order for the X electrode 11 and the Y electrode 12 to be insulated from each other with the configuration above, it is preferable that the metal film 17 have a greater thickness than the connecting member 112. In addition, in order for the X electrode 11 and the Y electrode 12 to be completely insulated from each other, it is preferable that the length d1 be at least 0.1 μm. It is more preferable that the length d1 be at least 0.3 μm. If the length d1 is less than 0.1 μm, there is a possibility that the connecting member 112 and the metal film 17 come into contact. If the length d1 is less than 0.3 μm, depending on how the connecting member 112 is formed and/or the thickness thereof, there is a possibility that the connecting member 112 and the metal film 17 come into contact.

<Manufacturing Method for Touch Panel 1>

Figure 7A:
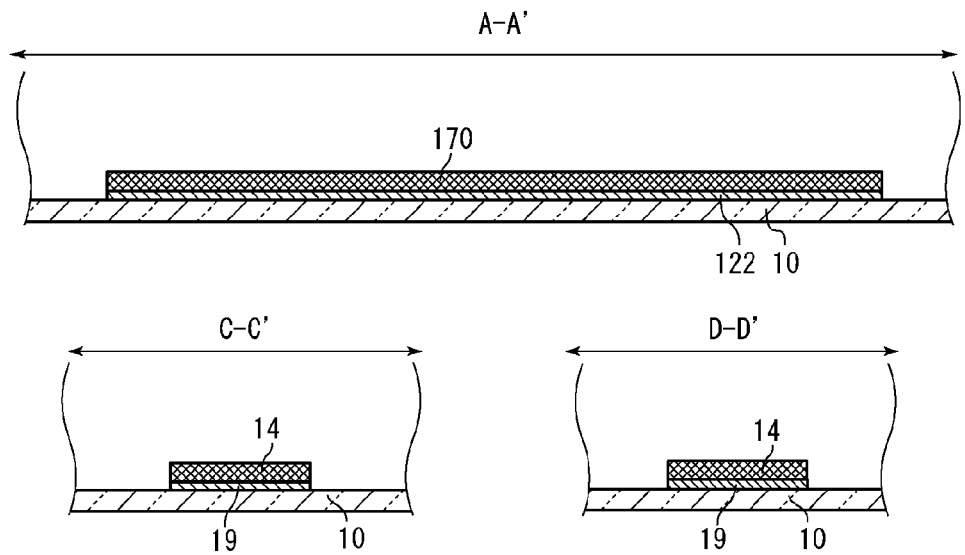
FIG. 7A shows cross-sectional views for describing a manufacturing method for the touch panel according to Embodiment 1 of the present invention.
Figure 7B:
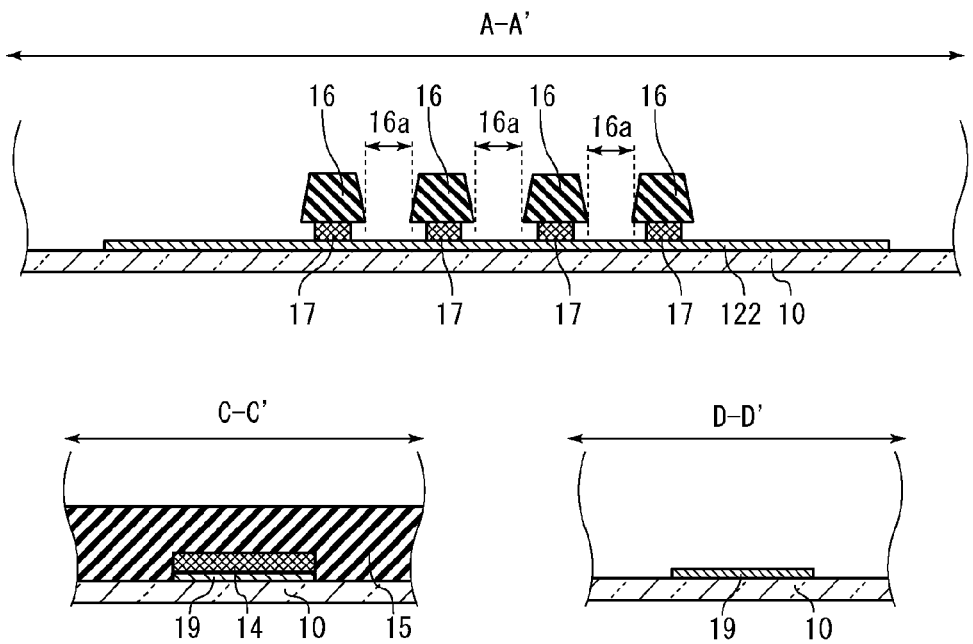
FIG. 7B shows cross-sectional views for describing a manufacturing method for the touch panel according to Embodiment 1 of the present invention.
Figure 7C:
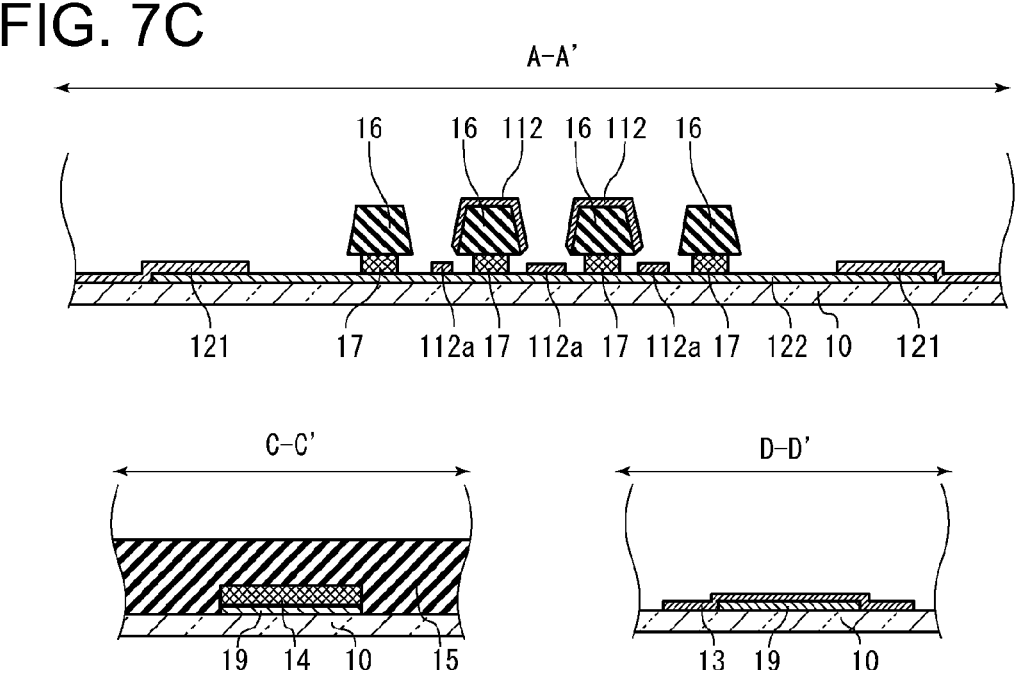
FIG. 7C shows cross-sectional views for describing a manufacturing method for the touch panel according to Embodiment 1 of the present invention.
Figure 7D:
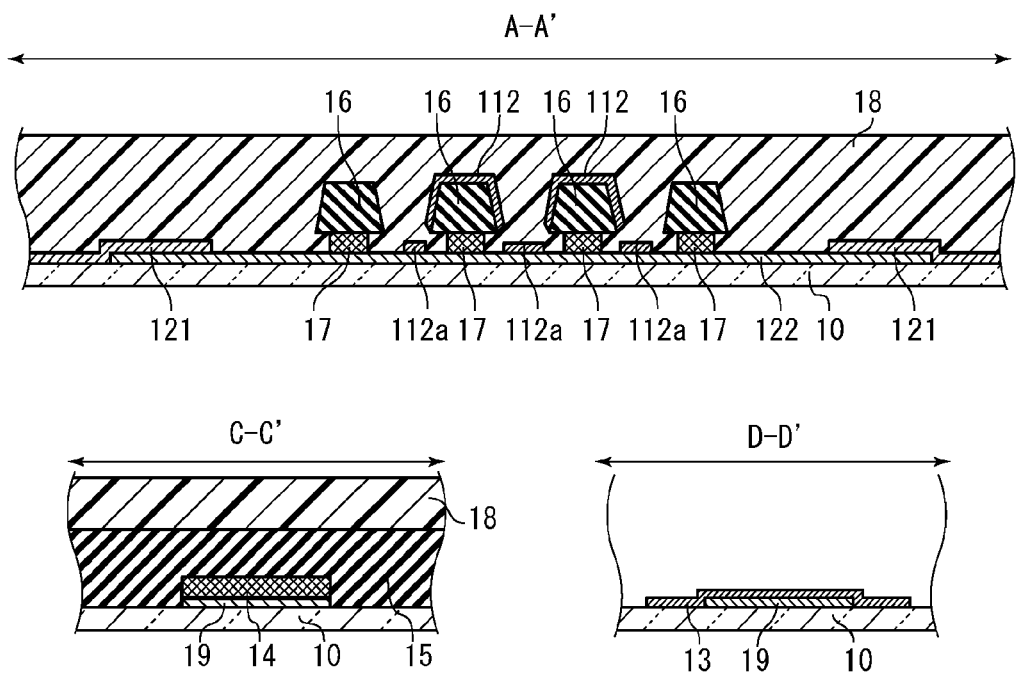
FIG. 7D shows cross-sectional views for describing a manufacturing method for the touch panel according to Embodiment 1 of the present invention.

A manufacturing method for the touch panel 1 will be described below with reference to FIGS. 7A to 7D. FIGS. 7A and 7D are a cross-sectional view of FIG. 5 along the line A-A', and cross-sectional views of FIG. 2 along the lines C-C' and D-D'.

First the insulating substrate 10 is prepared. The substrate 10 is a glass substrate, for example.

A uniform transparent conductive film is formed by sputtering or CVD (chemical vapor deposition) onto the entire surface of the insulating substrate 10. The transparent conductive film is ITO (indium tin oxide) or IZO (indium zinc oxide), for example. There is no special limitation on the thickness of the transparent conductive film, but it is 10 nm to 50 nm, for example.

A common metal film is formed by sputtering or vapor deposition over the transparent conductive film. The common metal film is a low-resistance metal film such as Al, for example. It is preferable that a structure be used in which a plurality of types of metal films are layered in order to improve the adhesion of the lower layer and upper layer, and to improve resistance to corrosion. A film in which MoNb, Al, and MoNb are layered in this order can be used, for example. There is no special limitation on the thickness of the common metal film, but it is 0.3 to 1.0 μm, for example.

The multilayer film including the transparent conductive film and the common metal film formed on the entire surface of the substrate 10 is patterned by photolithography. By patterning, the connecting member 122 of the Y electrode 12, the metal film 170, the wiring lines 14, and the conductive film 19 are formed (refer to FIG. 7A). Also, while not shown in FIG. 7A, the ground wiring line 141 and the conductive film 191 (refer to FIG. 2) are also formed in this patterning step.

Specifically, during patterning, a mask made of photoresist is initially formed on portions where the connecting members 122, the metal films 170, the wiring lines 14, the conductive films 19, and the like are to be formed. The remaining portions are removed by etching. Any etching method may be chosen, but it is possible to etch the transparent conductive film and the common metal film in one step by using a mixed acid including phosphoric acid, acetic acid, and nitric acid, for example. The connecting members 122 and the metal films 170 are patterned by the same mask, and thus, are formed into the same shape in the same positions in a plan view. This similarly applies to the wiring lines 14 and the conductive films 19, and the ground wiring line 141 and the conductive film 191.

After patterning is completed, annealing is performed at a temperature of 200 to 250° C. As a result of annealing, the transparent conductive film (connecting members 122, and conductive films 19 and 191), which had been amorphous, is made to be polycrystalline.

Next, the insulating films 15 and 16 are formed. As insulating films 15 and 16, a photoresist including an acrylic resin, a novolac resin, or the like can be used, for example. As insulating films 15 and 16, it is preferable that a black resin be used. The black resin can be formed by dispersing a black dye into the above-mentioned photoresist, for example.

Photoresist is evenly coated onto the entire surface of the substrate 10 by a spin coater or a slit coater. There is no special limitation on the thickness to which the photoresist is to be coated, but it is 1.5 to 3.0 μm.

The photoresist may be of a positive type in which the solubility thereof in developer decreases upon exposure to light, or a negative type in which the solubility thereof in developer increases upon exposure to light. After the coating of the photoresist, prebaking, exposure, developing, postbaking, and the like are performed, thus forming the insulating films 15 and 16 in prescribed locations. At this time, the contact holes 15a and the openings 16a are also formed.

The insulating films 15 and 16 can also be formed of an inorganic film. In such a case, an even inorganic film such as SiN, SiO$_2$, and SiON are formed by CVD over the entire surface of the substrate 10. There is no special limitation on the thickness of the inorganic film, but it is preferable that the thickness be greater than that of the common metal film. The inorganic film formed over the entire surface of the substrate 10 is patterned by photolithography, thus forming the insulating films 15 and 16. At this time, the contact holes 15a and the openings 16a are also formed. Specifically, the masks made of photoresist are formed where the insulating films 15 and 16 are to be formed, and the remaining portions are removed by etching. Any etching method may be chosen, but it is possible to use dry etching using a fluorine-based gas, for example.

After the insulating films 15 and 16 are formed, the metal film 170, the wiring lines 14, and the ground wiring line 141 are etched. At this time, the insulating films 15 and 16 serve as masks, and thus, only portions of the metal film 170, the wiring lines 14, and the ground wiring lines 141 that are not covered by the insulating films 15 and 16 (including the contact holes 15a and the opening 16a) are removed by etching. As a result, the metal films 17 are formed (refer to FIG. 7B). Also, portions of the wiring lines 14 and the ground wiring line 141 overlapping the terminals 13 are removed (refer to the cross-section in FIG. 7B along the line D-D'). It is preferable that etching be performed by an etchant that does not corrode the polycrystalline transparent conductive films (connecting members 122, and conductive films 19 and 191). By using such an etchant, it is possible to remove only the metal film 170, the wiring lines 14, and the ground wiring line 141 while leaving remaining the connecting members 122 and the conductive films 19. Etching can be performed by a mixed acid including phosphoric acid, acetic acid, and nitric acid, for example.

At this time, it is preferable that the metal film 170 and the like be etched not only in the thickness direction but in the direction perpendicular to the thickness direction (side etching). Specifically, by changing the mix ratio of the etchant to increase the etching rate or lengthening the etching time, it is possible to perform side etching. It is preferable that the metal film 170 and the like be overetched, which is etching of 100% or greater compared to an etching process in which the metal film 170 and the like are completely etched in the thickness direction (just-etching). It is preferable that the etching time be twice or greater compared to just-etching, for example.

By performing side etching, the edge face of the metal film 17 is located further to the inside than the edge face of the insulating film 16 by the length d1. Similarly, the size of each of the openings in the metal film 17 is greater than the size of each of the openings 16a of the insulating film 16, and the inner wall face of the opening of the metal film 17 is further to the outside than the inner wall face of the opening 16a of the insulating film 16 by the length d1.

Next, the island-shaped electrodes 111 of the X electrodes 11, the connecting members 112, the island-shaped electrodes 121 of the Y electrodes 12, and the terminals 13 are formed. First, a transparent conductive film made of ITO, IZO, or the like is formed evenly over the entire surface of the substrate 10 by sputtering or CVD. The thickness of the transparent conductive film is 10 to 50 nm, for example. Then by patterning by photolithography, the connecting members 112, the island-shaped electrodes 121, and the terminals 13 are formed (refer to FIG. 7C). Although not shown in FIG. 7C, the island-shaped electrodes 111 (refer to FIG. 4) are also formed at the same time.

Patterning is performed by first forming masks made of photoresist where the island-shaped electrodes 111 of the X electrodes 11, the connecting members 112, the island-shaped electrodes 121 of the Y electrodes 12, and the terminals 13 are to be formed. The remaining portions are then removed by etching. Any etching method may be chosen, but by using oxalic acid, for example, it is possible to remove only the amorphous transparent conductive film while leaving remaining the polycrystalline transparent conductive film (connecting members 122) and the metal films 17.

Lastly, the protective film 18 is evenly formed by a spin coater or slit coater (refer to FIG. 7D). At this time, portions of the terminals 13 are covered by masks such that the protective film 18 is not formed thereon. The protective film 18 is an acrylic resin, for example. There is no special limitation on the thickness of the protective film 18, but it is 2 µm to 3 µm, for example.

The configuration of the touch panel 1 and the manufacturing method according to Embodiment 1 of the present invention have been described above.

The touch panel 1 of the present embodiment can be manufactured by a process including four masks, which includes the following steps: patterning (FIG. 7A) to form the connecting members 122, the metal film 170, the conductive films 19 and 191, the wiring lines 14, and the ground wiring line 141; patterning (FIG. 7B) to form the insulating films 15 and 16, the metal films 17, and the like; patterning (FIG. 7C) to form the island-shaped electrodes 111 and 121, the connecting members 112, and the terminals 13; and patterning (FIG. 7D) to form the protective film 18. In other words, in the present embodiment, it is possible to form the connecting members 122 and the wiring lines 14 using the same mask. Thus, it is possible to have a simplified manufacturing process compared to a configuration in which different masks need to be used to make the connecting members 122 and for the wiring lines 14.

The metal films 17 are formed on the connecting members 122 only where they are covered by the insulating films 16. Thus, the area of metal is less than for a configuration in which the entire connecting member 122 is made of metal, for example. Thus, the electrode patterns are difficult to see. The area of the metal films 17 is made even smaller by forming a plurality of openings 16a in the insulating films 16.

The area of the metal films 17 can be made even smaller than that of the insulating films 16 by performing side etching.

By making the insulating films 16 of a black resin, the reflection of light by the metal films 17 is mitigated, thus making the electrode patterns more difficult to see.

As shown in FIG. 4 and the like, the area of the connecting member 122 of the Y electrode 12 is less than that of the island-shaped electrode 121. Thus, the Y electrode 12 has a high electric resistance at the connecting member 122. By layering the metal film 17 with a low resistance over this area, it is possible to improve the conductivity of the entire Y electrode 12.

<Comparison Example 1>

Here, in order to explain the effect of the touch panel 1 of the present embodiment, two hypothetical comparison examples will be described.

Figure 8:
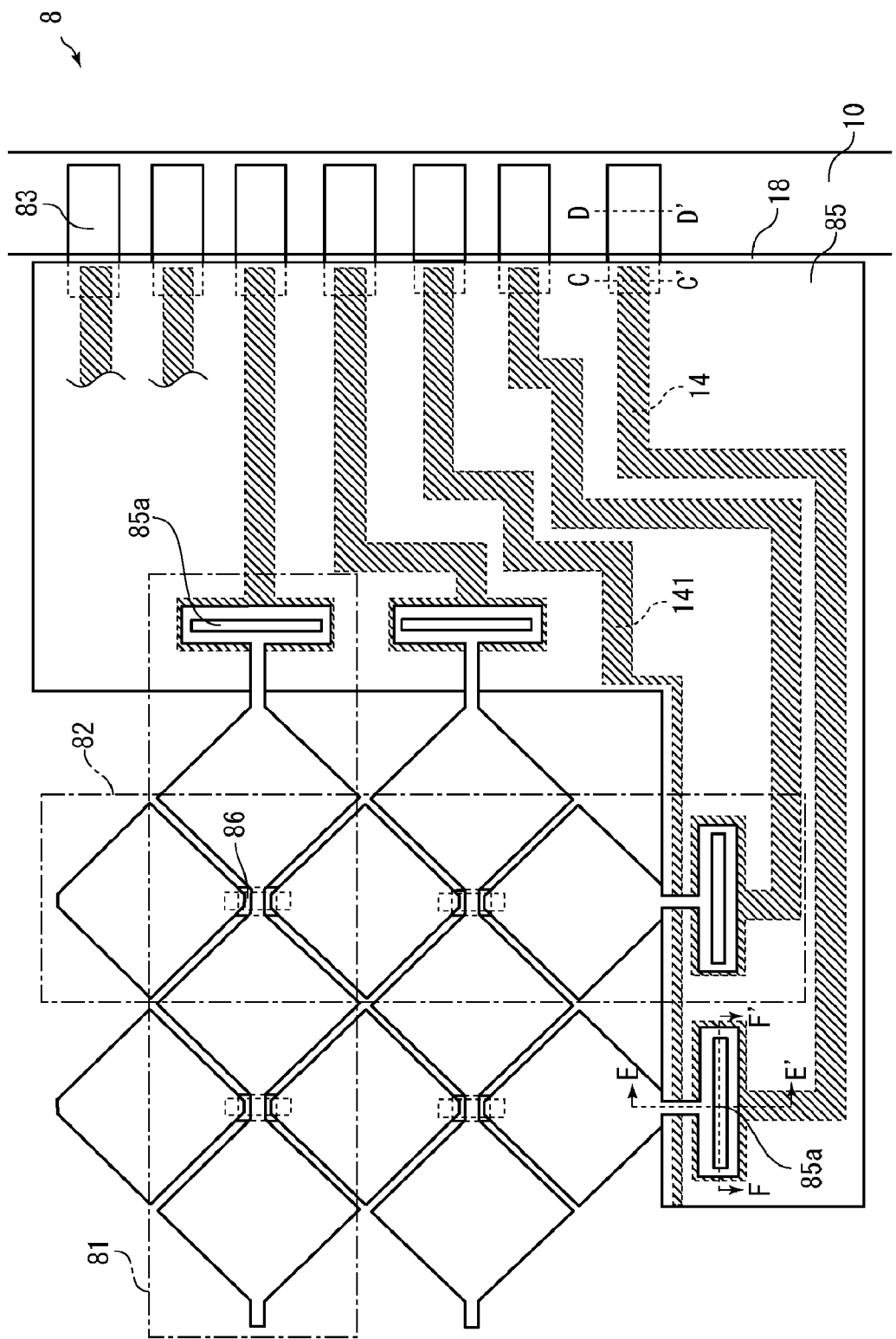
FIG. 8 is a plan view that shows a schematic configuration of a touch panel according to Comparison Example 1.
Figure 9:
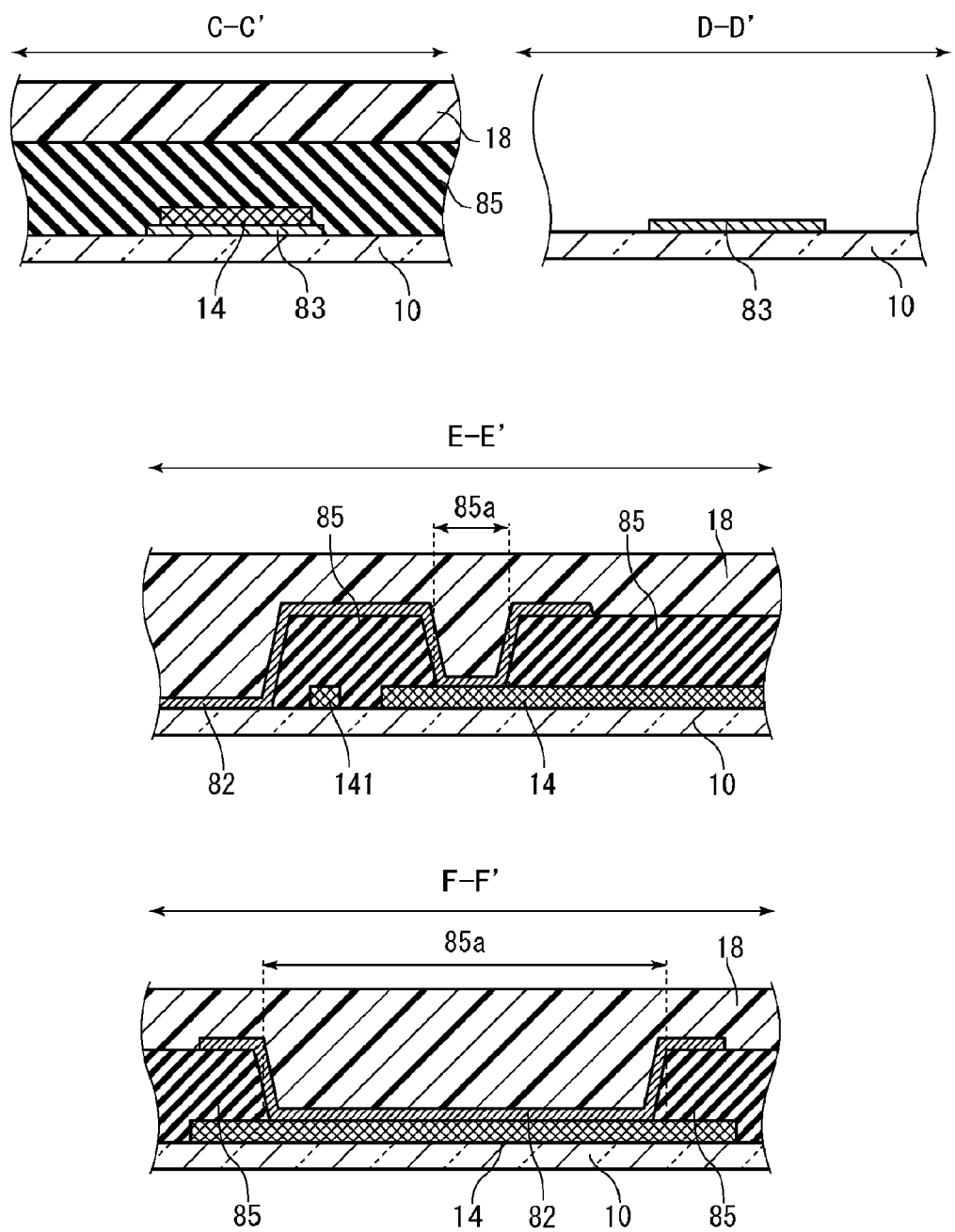
FIG. 9 shows cross-sectional views of FIG. 8 along the lines C-C', D-D', E-E', and F-F'.

FIG. 8 is a plan view that shows a schematic configuration of a touch panel 8 according to Comparison Example 1. FIG. 9 shows cross-sectional views of FIG. 8 along the lines C-C', D-D', E-E', and F-F'. The touch panel 8 includes a substrate 10, X electrodes 81, Y electrodes 82, terminals 83, wiring lines 14, a ground wiring line 141, insulating films 85 and 86, and a protective film 18. In FIG. 8, the wiring lines 14 and the ground wiring line 141 are depicted with a hatching pattern for ease of viewing.

Similar to the touch panel 1, the insulating film 85 has contact holes 85a formed therein. The X electrodes 81, the Y electrodes 82, and the wiring lines 14 are connected through the contact holes 85a. As shown in FIG. 9, unlike the touch panel 1, the wiring lines 14 are also formed where the contact holes 85a are formed. Thus, in both the cross-section along the line E-E' and the cross-section along the line F-F', the Y electrodes 82 and the wiring lines 14 are in contact at the contact holes 85a. This similarly applies to the X electrodes 81 and the wiring lines 14.

Unlike the touch panel 1, in the touch panel 8, there are no conductive films below (towards the substrate 10) the wiring lines 14 or the ground wiring line 141. As shown in FIG. 9, the terminals 83 are formed to overlap the wiring lines 14, and thus, the terminals 83 are electrically connected to the wiring lines 14.

With this configuration, the X electrodes 81, the wiring lines 14, and the terminals 83 are electrically connected to each other. Similarly, the Y electrodes 82, the wiring lines 14, and the terminals 83 are electrically connected to each other.

Figure 10:
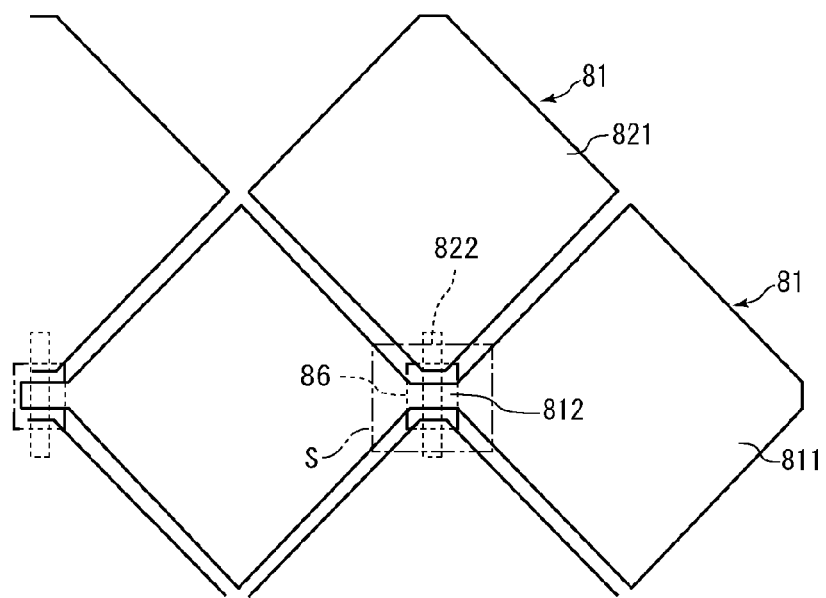
FIG. 10 shows a magnified view of the vicinity of X electrodes and Y electrodes from a configuration of the touch panel according to Comparison Example 1.
Figure 11:
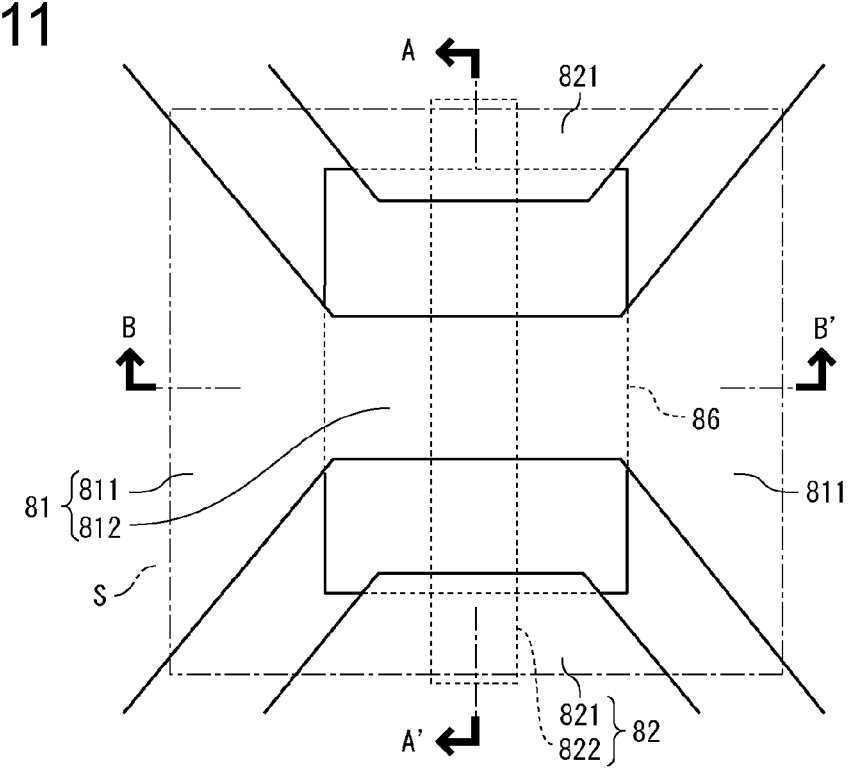
FIG. 11 shows a further magnified view of a portion where an X electrode and a Y electrode intersect (rectangular region S in FIG. 10).
Figure 12:
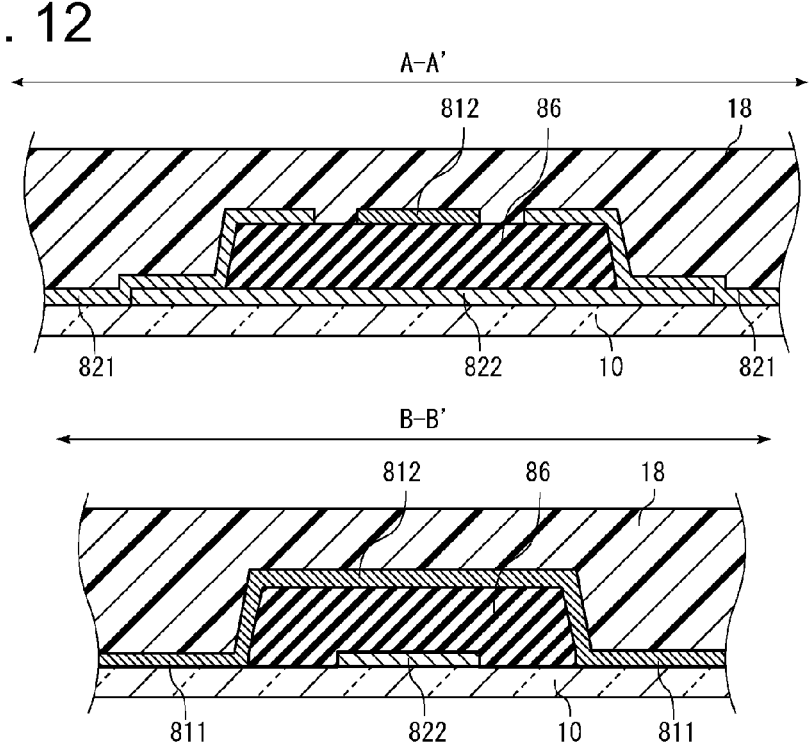
FIG. 12 shows cross-sectional views of FIG. 11 along the lines A-A' and B-B'.

FIG. 10 shows a magnified view of a vicinity of an X electrode 81 and a Y electrode 82 from the configuration of the touch panel 8. FIG. 11 shows a further magnified view of a portion where the X electrode 81 and the Y electrode 82 intersect (rectangular region S in FIG. 10). FIG. 12 shows cross-sectional views of FIG. 11 along the lines A-A' and B-B'.

Like the X electrode 11 of the touch panel 1, the X electrode 81 of the touch panel 8 includes a plurality of island-shaped electrodes 811 and connecting members 812 that connect adjacent island-shaped electrodes 811. The Y electrodes 82 include a plurality of island-shaped electrodes 821, and connecting members 822 that connect adjacent island-shaped electrodes 821. Where the connecting member 812 of the X electrode 81 and the connecting member 822 of the Y electrode 82 intersect, an insulating film 86 is formed therebetween.

Unlike the touch panel 1, in the touch panel 8, no metal films are formed in portions where the X electrodes 81 and the Y electrodes 82 intersect.

<Manufacturing Method for Touch Panel 8>

A manufacturing method for the touch panel 8 will be schematically described below with reference to FIGS. 13A to 13E. FIGS. 13A to 13E are a cross-sectional view of FIG. 11 along the line A-A', and cross-sectional views of FIG. 8 along the lines C-C' and D-D'.

An even transparent conductive film is formed on the entire surface of the insulating substrate 10 by sputtering or CVD. The connecting members 822 and the terminals 83 are formed by patterning by photolithography (refer to FIG. 13A). After patterning, the connecting members 822 and the terminals 83 are annealed and thus made to be polycrystalline.

Next, a common metal film is formed by sputtering or vapor deposition over the entire substrate 10. The wiring lines 14 are formed by patterning by photolithography (refer to FIG. 13B). A ground wiring line 141 (refer to FIG. 8) is also formed at the same time although it is not shown in FIG. 13B.

Figure 13A:
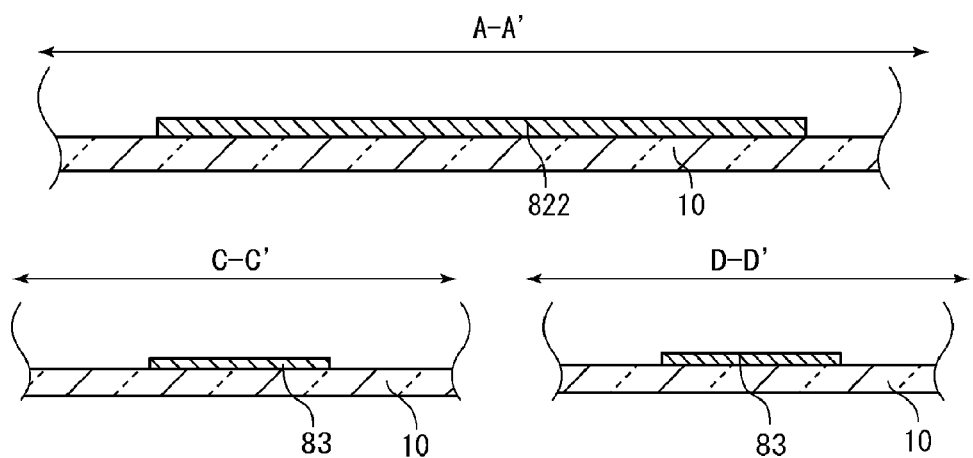
FIG. 13A shows cross-sectional views for describing a manufacturing method for the touch panel according to Comparison Example 1.
Figure 13B:
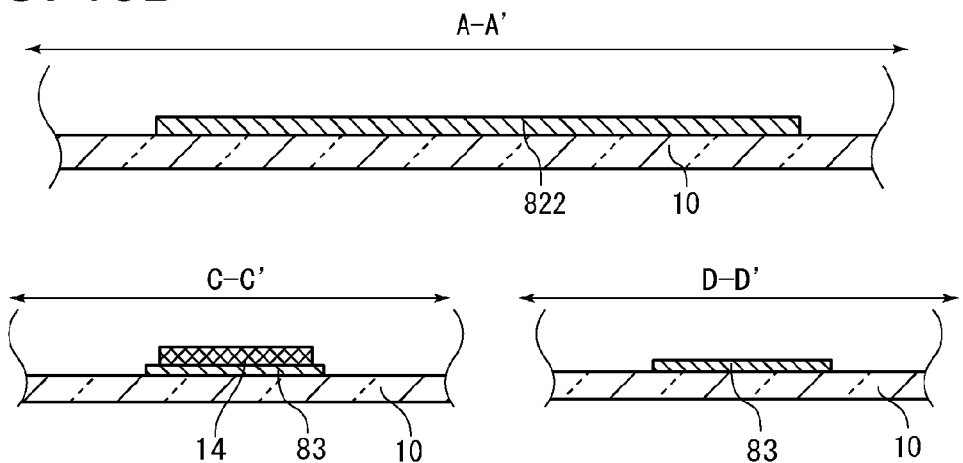
FIG. 13B shows cross-sectional views for describing a manufacturing method for the touch panel according to Comparison Example 1.
Figure 13C:
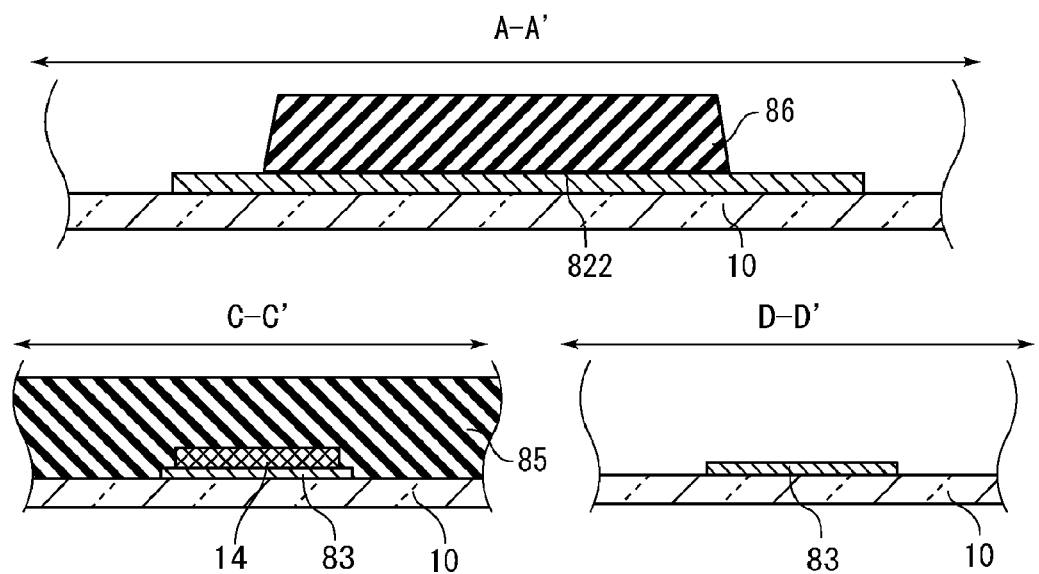
FIG. 13C shows cross-sectional views for describing a manufacturing method for the touch panel according to Comparison Example 1.
Figure 13D:
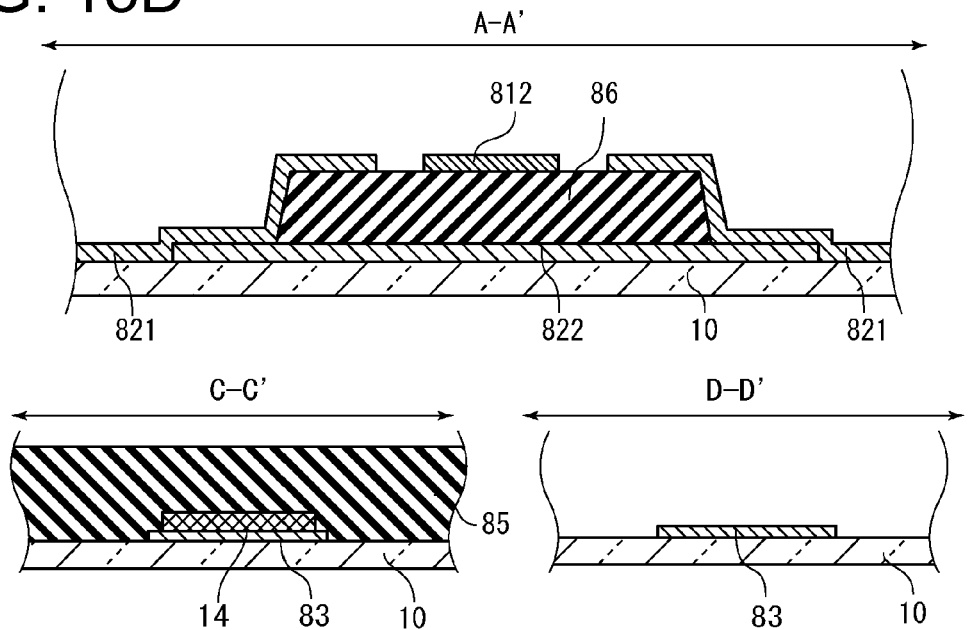
FIG. 13D shows cross-sectional views for describing a manufacturing method for the touch panel according to Comparison Example 1.

Next, the insulating films 85 and 86 are formed (refer to FIG. 13C). Like the touch panel 1, the insulating films 85 and 86 may be made of photoresist or of an inorganic film. Although not shown in FIG. 13C, the contact holes 85a (refer to FIG. 8) are also formed at the same time.

Next, an even transparent conductive film is formed on the entire surface of the insulating substrate 10 by sputtering or CVD. The connecting members 812 and the island-shaped electrodes 821 (refer to FIG. 13D) are formed by patterning by photolithography. Although not shown in FIG. 13D, the island-shaped electrodes 811 (refer to FIG. 10) are also formed at the same time.

Figure 13E:
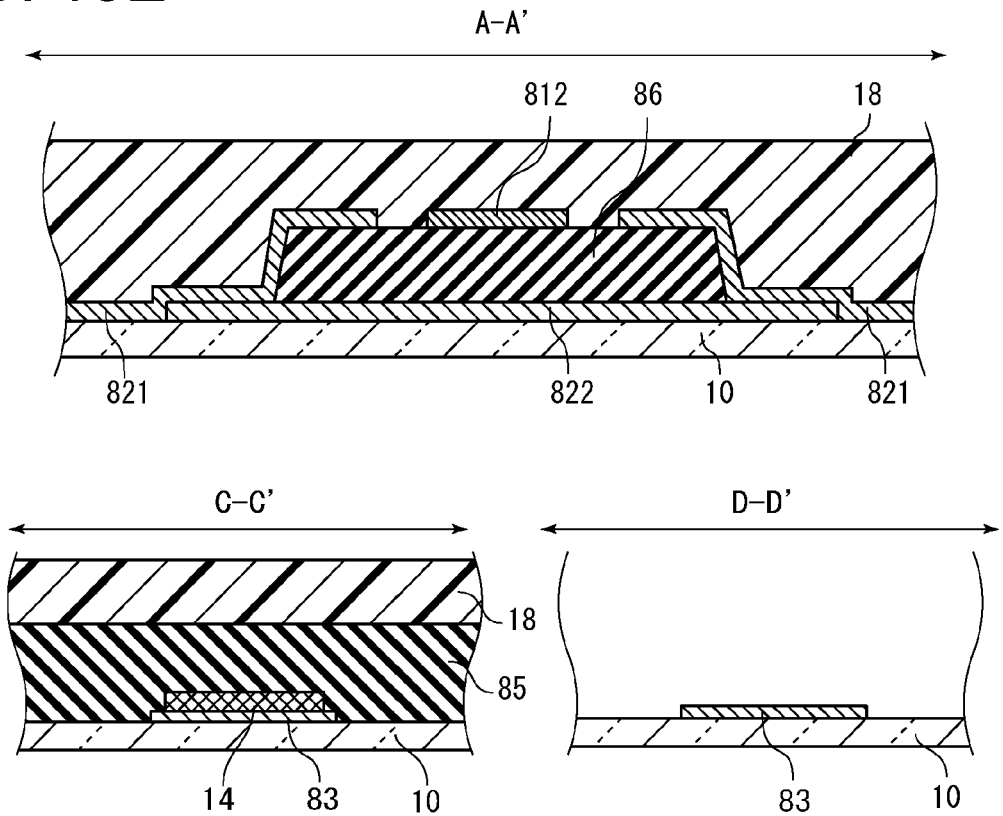
FIG. 13E shows cross-sectional views for describing a manufacturing method for the touch panel according to Comparison Example 1.

Lastly, the protective film 18 is evenly formed by a spin coater or slit coater (refer to FIG. 13E). At this time, portions of the terminals 83 are covered by masks such that the protective film 18 is not formed thereon.

The configuration of the touch panel 8 and the manufacturing method according to Comparison Example 1 have been described above.

In the touch panel 8, there are no metal films at locations where the X electrodes 81 and the Y electrodes 82 intersect. Thus the electrode patterns are difficult to see. However, in order to attain the configuration of the touch panel 8, it is necessary to have a process including five masks, which includes the following steps: patterning (FIG. 13A) to form the connecting members 822 and the terminals 83; patterning (FIG. 13B) to form the wiring lines 14 and the ground wiring line 141; patterning (FIG. 13C) to form the insulating films 85 and 86; patterning (FIG. 13D) to form the island-shaped electrodes 811 of the X electrodes 81, the connecting members 812, and the island-shaped electrodes 821 of the Y electrodes 82; and patterning (FIG. 13E) to form the protective film 18.

According to the configuration of the touch panel 1 of the present embodiment, it is possible to form the connecting members 122 and the wiring lines 14 by the same mask. Thus, it is possible to simplify the manufacturing process compared to the configuration of the touch panel 8.

<Comparison Example 2>

Figure 14:
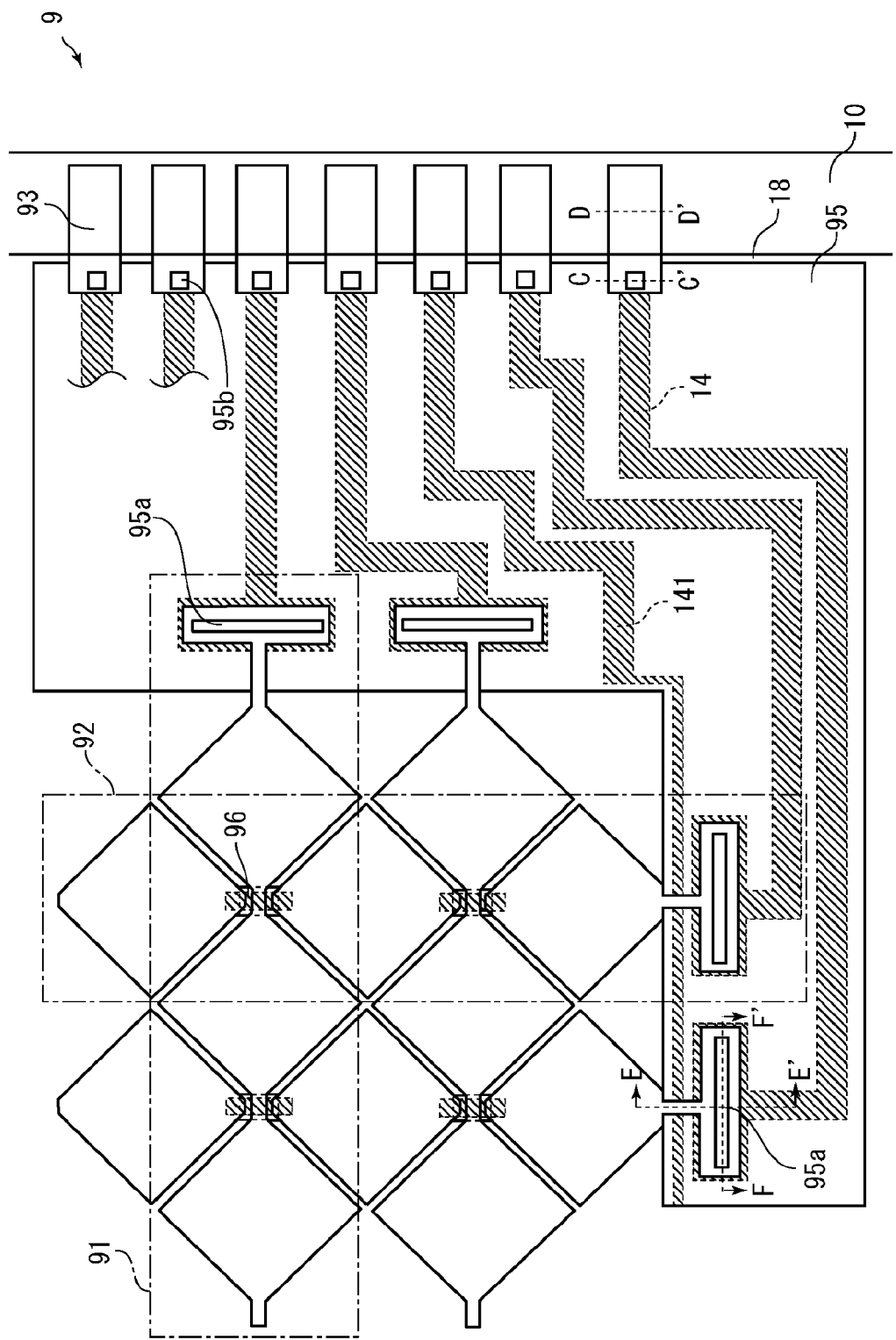
FIG. 14 is a plan view that shows a schematic configuration of a touch panel according to Comparison Example 2.
Figure 15:
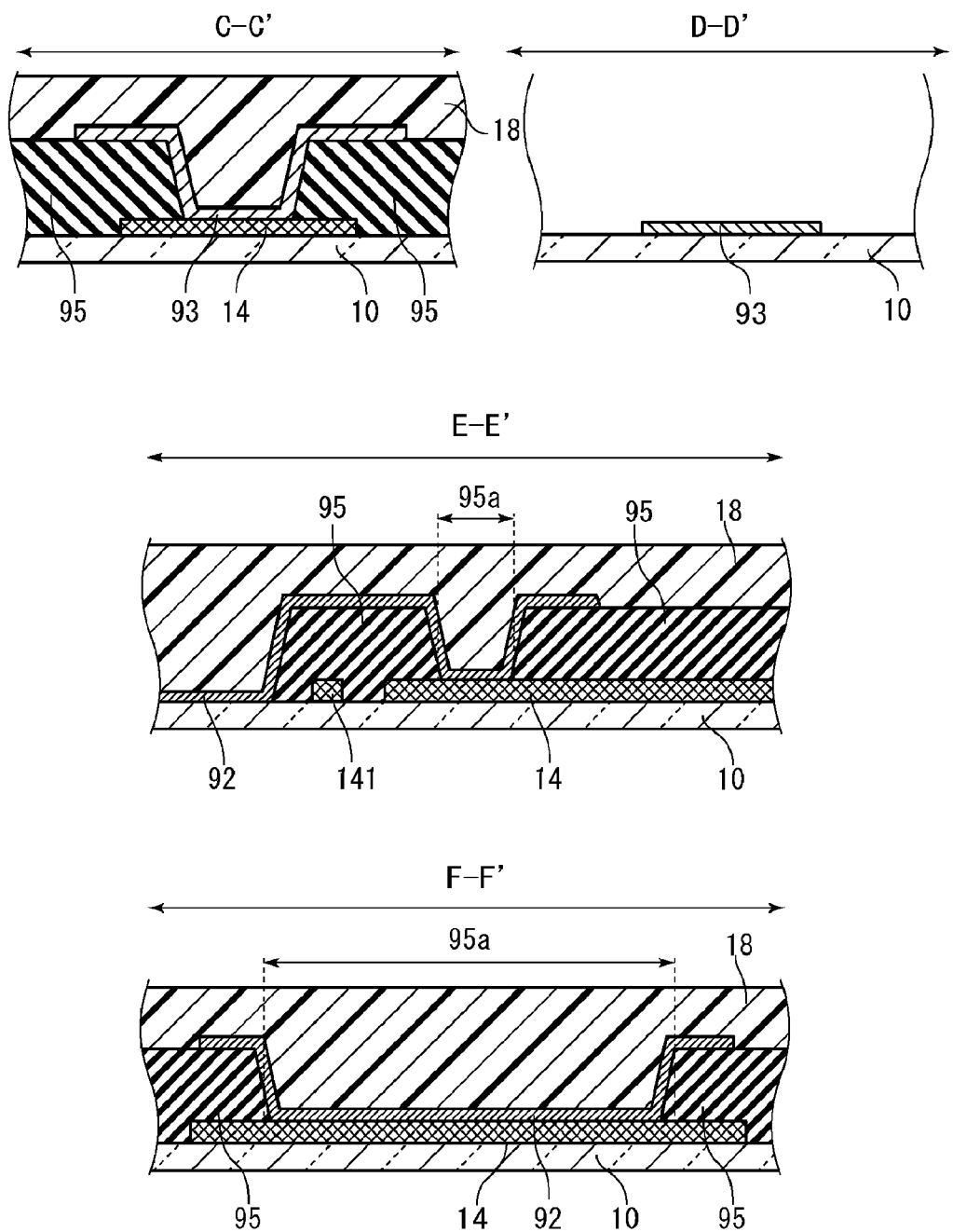
FIG. 15 shows cross-sectional views of FIG. 14 along the lines C-C', D-D', E-E', and F-F'.

FIG. 14 is a plan view that shows a schematic configuration of a touch panel 9 according to Comparison Example 2. FIG. 15 shows cross-sectional views of FIG. 14 along the lines C-C', D-D', E-E', and F-F'. The touch panel 9 includes a substrate 10, X electrodes 91, Y electrodes 92, terminals 93, wiring lines 14, a ground wiring line 141, insulating films 95 and 96, and a protective film 18. In FIG. 14, the wiring lines 14 and the ground wiring line 141 are depicted with a hatching pattern for ease of viewing. As described below, portions of the Y electrodes 92 are made of the same metal as the wiring lines 14 and the like, and these portions are also schematically shown with a hatching pattern.

The insulating film 95 has formed therein contact holes 95a. The X electrodes 91 and the Y electrodes 92 are connected to the wiring lines 14 through the contact holes 95a. As shown in FIG. 15, in both the cross-section along the line E-E' and the cross-section along the line F-F', the Y electrodes 92 and the wiring lines 14 are in contact with each other at the contact holes 95a. This similarly applies to the X electrodes 91 and the wiring lines 14.

The insulating film 95 also has contact holes 95b formed therein. The wiring lines 14 and ground wiring lines 141 are connected to the terminals 93 through the contact holes 95b. As shown in FIGS. 14 and 15, the terminals 93 are formed so as to overlap portions of the insulating film 95 and the contact holes 95b, and the wiring lines 14 and ground wiring lines 141 are in contact therewith at the contact holes 95b.

With this configuration, the X electrodes 91, the wiring lines 14, and the terminals 93 are electrically connected to each other. Similarly, the Y electrodes 92, the wiring lines 14, and the terminals 93 are electrically connected to each other.

Figure 16:
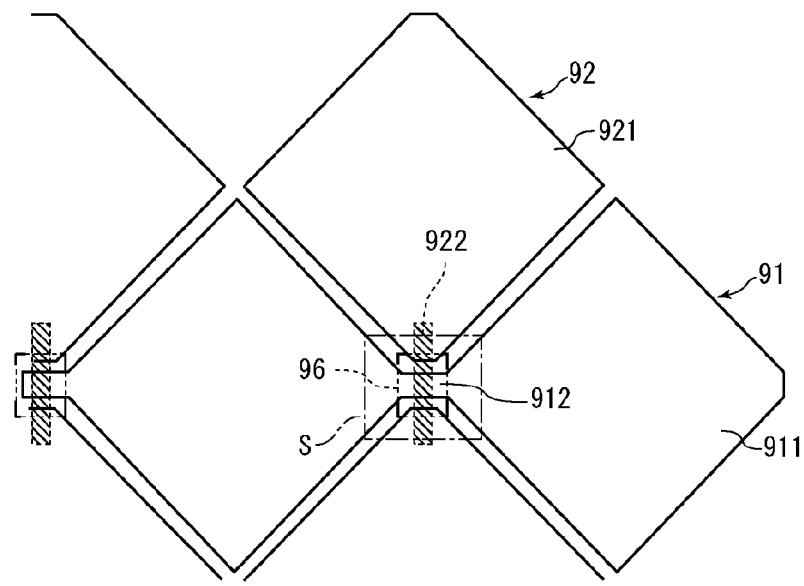
FIG. 16 shows a magnified view of the vicinity of X electrodes and Y electrodes from a configuration of the touch panel according to Comparison Example 2.
Figure 17:
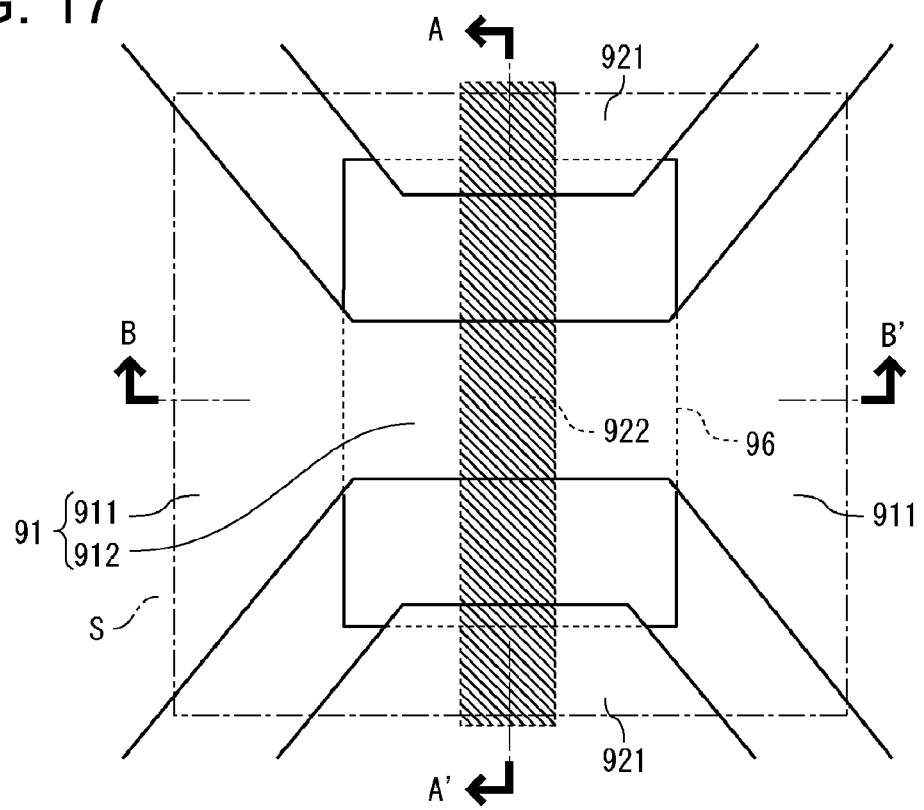
FIG. 17 shows a further magnified view of a portion where an X electrode and a Y electrode intersect (rectangular region S in FIG. 16).
Figure 18:
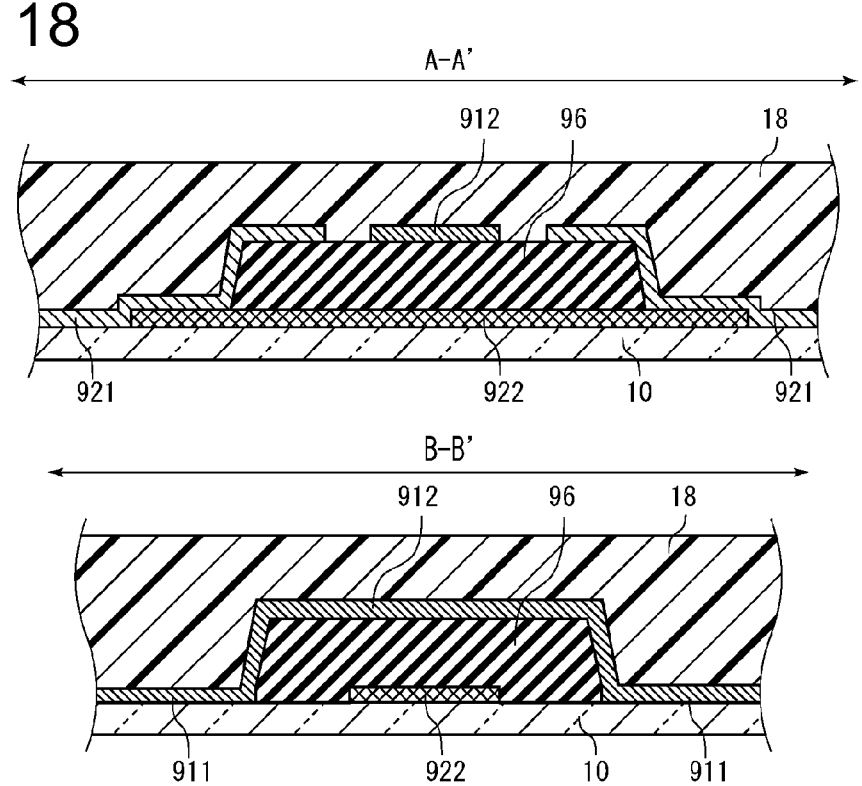
FIG. 18 shows cross-sectional views of FIG. 17 along the lines A-A' and B-B'.

FIG. 16 shows a magnified view of a vicinity of an X electrode 91 and a Y electrode 92 from the configuration of the touch panel 9. FIG. 17 shows a further magnified view of a portion where the X electrode 91 and the Y electrode 92 intersect (rectangular region S in FIG. 16). FIG. 18 shows cross-sectional views of FIG. 17 along the lines A-A' and B-B'.

Like the X electrode 11 of the touch panel 1, the X electrode 91 of the touch panel 9 includes a plurality of island-shaped electrodes 911 and connecting members 912 that connected adjacent island-shaped electrodes 911. The Y electrodes 92 include a plurality of island-shaped electrodes 921, and connecting members 922 that connect adjacent island-shaped electrodes 921. Where the connecting member 912 of the X electrode 91 and the connecting member 922 of the Y electrode 92 intersect, an insulating film 96 is formed therebetween.

Unlike the touch panel 1, in the touch panel 9, the connecting members 922 of the Y electrodes 92 are made of the same metal as the wiring lines 14 and the like.

<Manufacturing Method for Touch Panel 9>

A manufacturing method for the touch panel 9 will be schematically described below with reference to FIGS. 19A to 19D. FIGS. 19A to 19D are a cross-sectional view of FIG. 17 along the line A-A', and cross-sectional views of FIG. 14 along the lines C-C' and D-D'.

A common metal film is formed by sputtering or vapor deposition over the entire surface of the insulating substrate 10. The connecting members 922 and the wiring lines 14 are formed by patterning by photolithography (refer to FIG. 19A). A ground wiring line 141 (refer to FIG. 14) is also formed at the same time although it is not shown in FIG. 19A.

Figure 19A:
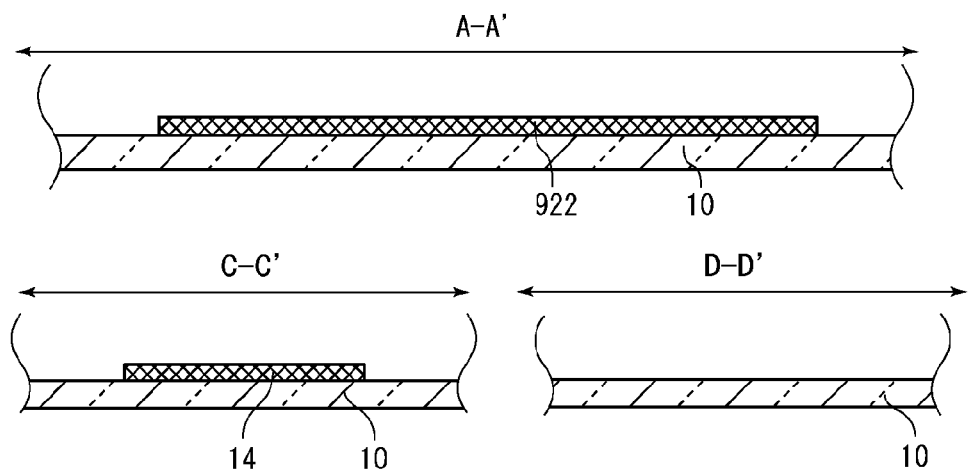
FIG. 19A shows cross-sectional views for describing a manufacturing method for the touch panel according to Comparison Example 2.
Figure 19B:
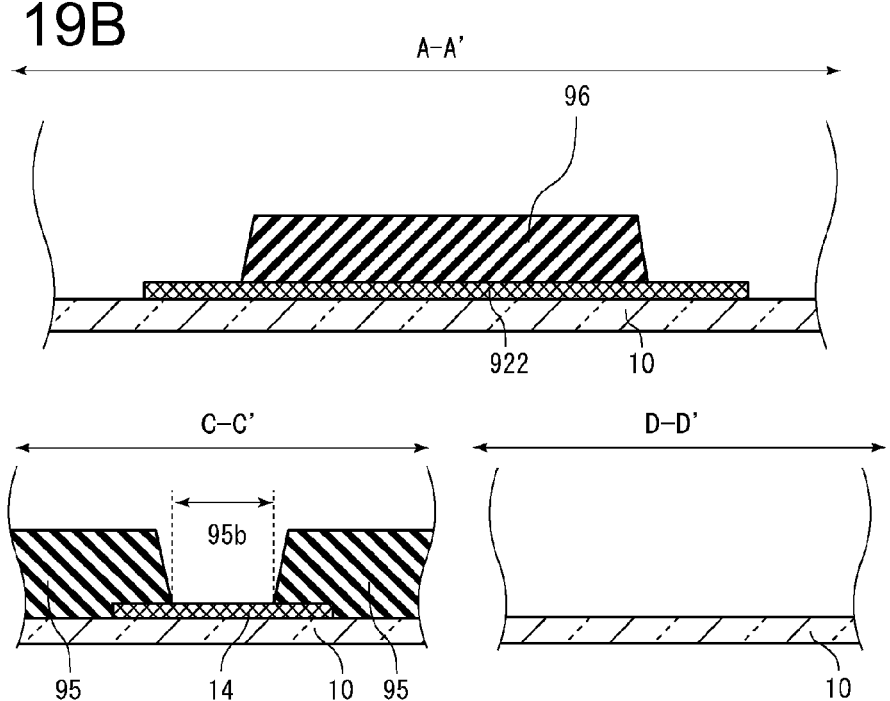
FIG. 19B shows cross-sectional views for describing a manufacturing method for the touch panel according to Comparison Example 2.
Figure 19C:
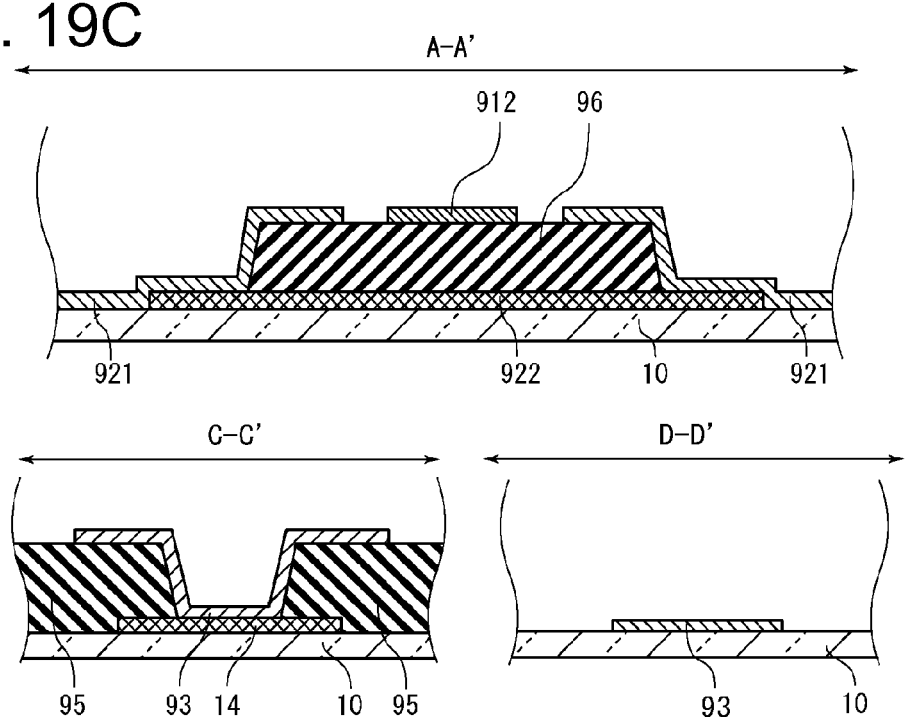
FIG. 19C shows cross-sectional views for describing a manufacturing method for the touch panel according to Comparison Example 2.

Next, the insulating films 95 and 96 are formed (refer to FIG. 19B). Like the touch panel 1, the insulating films 95 and 96 may be made of photoresist or of an inorganic film. At this time, the contact holes 95a (refer to FIG. 14) and the contact holes 95b are also formed at the same time.

Next, an even transparent conductive film is formed on the entire surface of the substrate 10 by sputtering or CVD. By patterning by photolithography, the connecting members 912, the island-shaped electrodes 921, and the terminals 93 are formed (refer to FIG. 19C). Although not shown in FIG. 19C, the island-shaped electrodes 911 (refer to FIG. 16) are also formed at the same time.

Figure 19D:
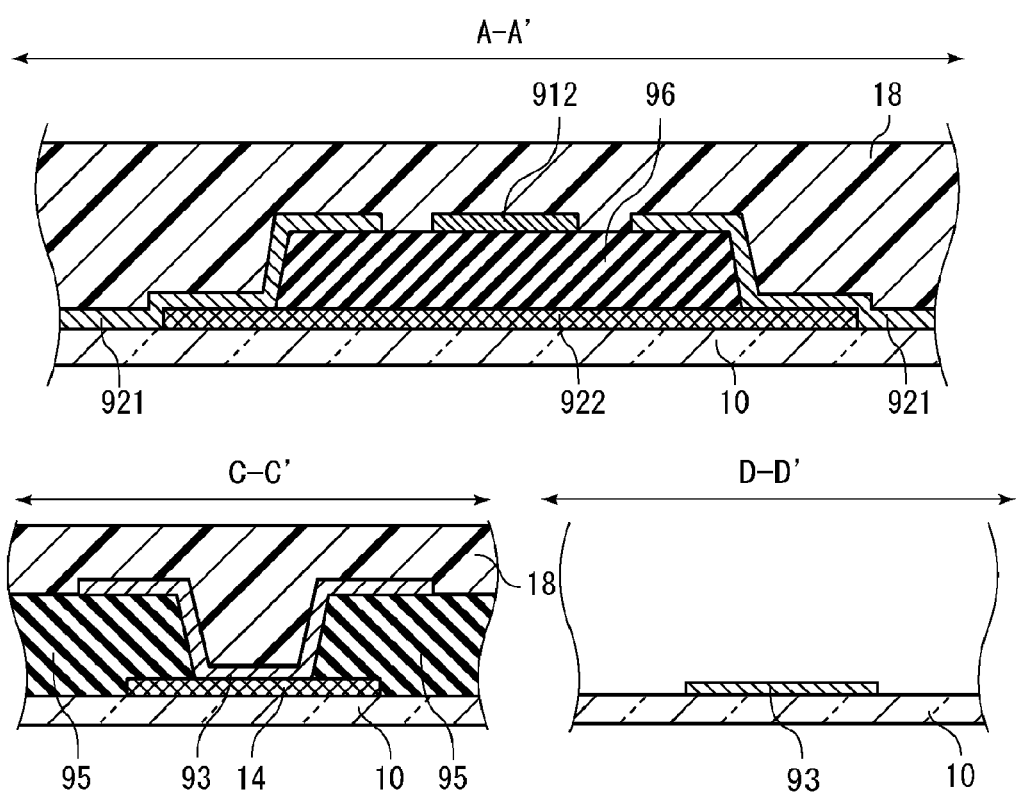
FIG. 19D shows cross-sectional views for describing a manufacturing method for the touch panel according to Comparison Example 2.

Lastly, the protective film 18 is evenly formed by a spin coater or slit coater (refer to FIG. 19D). At this time, portions of the terminals 93 are covered by masks such that the protective film 18 is not formed thereon.

The configuration of the touch panel 9 and the manufacturing method according to Comparison Example 2 have been described above.

The touch panel 9 can be manufactured by a process including four masks, which includes the following steps: patterning (FIG. 19A) to form the connecting members 922, the wiring lines 14, and the ground wiring lines 141; patterning (FIG. 19B) to form the insulating films 95 and 96; patterning (FIG. 19C) to form the island-shaped electrodes 911 of the X electrodes 91, the connecting members 912, the island-shaped electrodes 922 of the Y electrodes 92, and the terminals 93; and patterning (FIG. 19D) to form the protective film 18. However, the connecting members 922 of the Y electrodes 92 are made of a metal with a high reflectance, and thus, the electrode patterns can be easily seen.

According to the configuration of the touch panel 1 of the present embodiment, the metal films 17 are on the connecting members 122 only in portions covered by the insulating films 16. The area of the metal films 17 is made even smaller by forming a plurality of openings 16a in the insulating films 16. Also, the area of the metal films 17 can be made even smaller than that of the insulating films 16 by performing side etching. Thus, the electrode patterns are difficult to see compared to the configuration of the touch panel 9.

<Embodiment 2>

The display device 100 equipped with a touch panel may include any of touch panels 2 to 4 to be described below instead of the touch panel 1.

Figure 20:
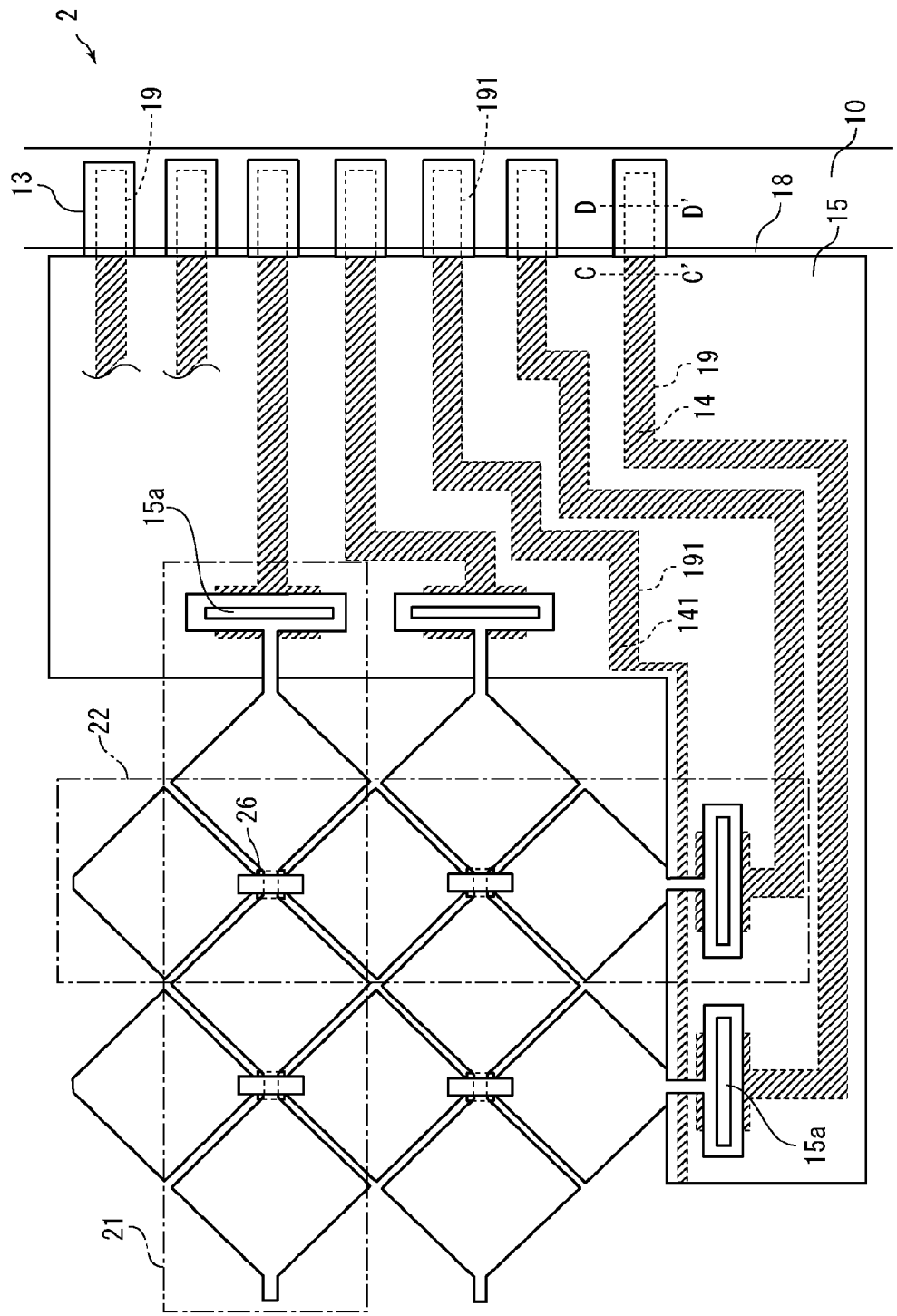
FIG. 20 is a plan view that shows a schematic configuration of a touch panel according to Embodiment 2 of the present invention.

FIG. 20 is a plan view that shows a schematic configuration of a touch panel 2 according to Embodiment 2 of the present invention. The touch panel 2 includes a substrate 10, X electrodes 21, Y electrodes 22, terminals 13, wiring lines 14, a ground wiring line 141, insulating films 15 and 26, conductive films 19 and 191, and a protective film 18. The touch panel 2 differs from the touch panel 1 in the configuration of the X electrodes, the Y electrodes, and the intersections between the X electrodes and Y electrodes. In FIG. 20, the wiring lines 14 and the ground wiring line 141 are depicted with a hatching pattern for ease of viewing.

Figure 21:
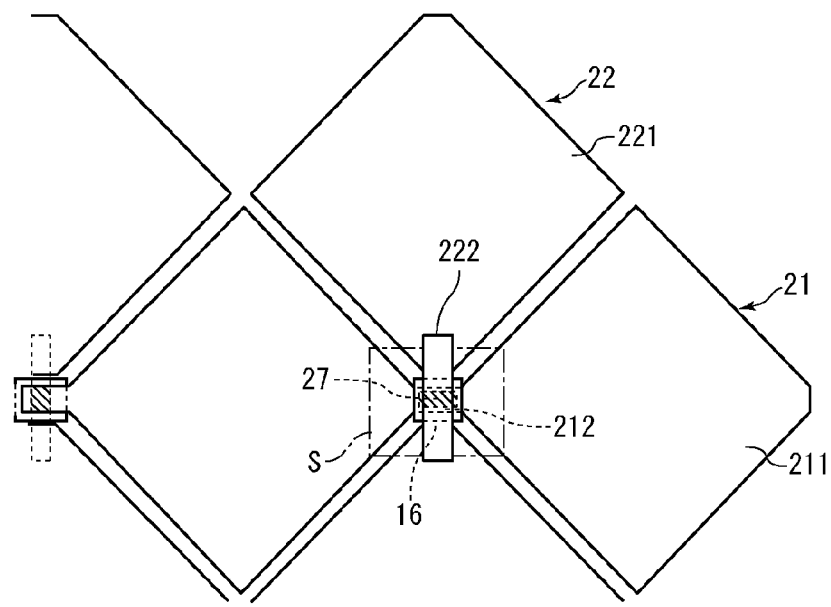
FIG. 21 shows a magnified view of the vicinity of X electrodes and Y electrodes from a configuration of the touch panel according to Embodiment 2 of the present invention.
Figure 22:
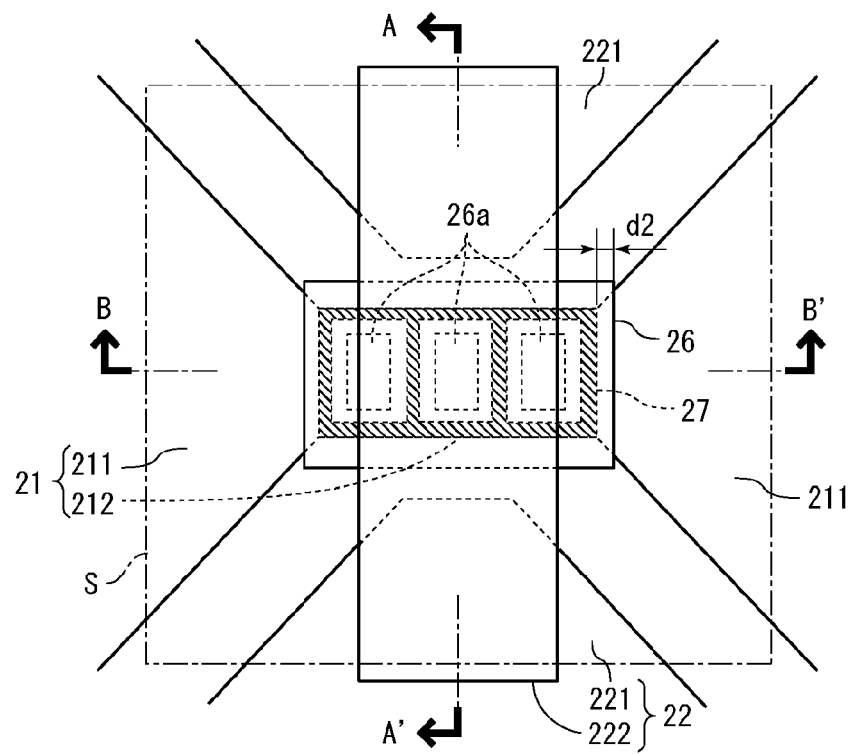
FIG. 22 shows a further magnified view of a portion where an X electrode and a Y electrode intersect (rectangular region S in FIG. 21).

FIG. 21 shows a magnified view of a vicinity of an X electrode 21 and a Y electrode 22 from the configuration of the touch panel 2. FIG. 22 shows a further magnified view of a portion where the X electrode 21 and the Y electrode 22 intersect (rectangular region S in FIG. 21). FIG. 23 shows cross-sectional views of FIG. 22 along the lines A-A' and B-B'. The touch panel 2 has a metal film 27, similar to the touch panel 1. In FIGS. 21 and 22, the metal film 27 is schematically shown with a hatching pattern.

Like the X electrode 11 of the touch panel 1, the X electrode 21 of the touch panel 2 includes a plurality of island-shaped electrodes 211 and connecting members 212 that connect adjacent island-shaped electrodes 211. The Y electrodes 22 include a plurality of island-shaped electrodes 221, and connecting members 222 that connect adjacent island-shaped electrodes 221.

As shown in FIG. 22, where the connecting members 212 of the X electrodes 21 and the connecting members 222 of the Y electrodes 22 intersect, the insulating films 26 are formed therebetween. Also, a metal film 27 is formed where the connecting member 212 of the X electrode 21 and the insulating film 26 overlap in a plan view. More specifically, an edge face of the metal film 27 is further to the inside than an edge face of the insulating film 26 by a length d2.

As shown in FIG. 23, the metal films 27 are formed on the connecting members 212 and below the insulating films 26.

The insulating film 26 has formed therein a plurality of openings 26a. The metal film 27 is not formed in portions corresponding to the openings 26a. In other words, the openings 26a of the insulating film 26 also penetrate the metal film 27. More specifically, the size of each of the openings in the metal film 27 is greater than the size of each of the openings 26a of the insulating film 26. As shown in FIG. 23, the inner wall face of the opening of the metal film 27 is further to the outside of the inner wall face of the opening 26a of the insulating film 26 by the length d2.

The connecting members 222 of the Y electrodes 22 connect the island-shaped electrodes 221 to each other over the insulating film 26. At this time, the connecting member 222 is also formed to overlap the opening 26a of the insulating film 26. However, as previously mentioned, the metal film 27 is not formed in portions corresponding to the opening 26a. Thus, as shown in FIG. 23, the thickness of the metal film 27 results in a step being formed in this location. This step causes the connecting member 222 to be divided. In FIG. 23, the portion of the connecting member 222 formed in the opening 26a and separated from the rest of the connecting member 222 is assigned the reference character 222a. Also, the size of each of the openings in the metal film 27 is greater than the size of each of the openings 26a of the insulating film 26. Thus, the connecting member 222 and the metal film 27 do not come into contact. As a result of such configuration, the X electrode 21 and the Y electrode 22 are not electrically connected through the opening 26a, and are thus insulated from each other.

In order for the X electrode 21 and the Y electrode 22 to be insulated from each other with the configuration above, it is preferable that the metal film 27 have a greater thickness than the connecting member 222. In addition, in order for the X electrode 21 and the Y electrode 22 to be completely insulated from each other, it is preferable that the length d2 be at least 0.1 μm. It is more preferable that the length d2 be at least 0.3 μm. If the length d2 is less than 0.1 μm, there is a possibility that the connecting member 222 and the metal film 27 come into contact. If the length d2 is less than 0.3 μm, depending on how the connecting member 222 is formed and/or the thickness thereof, there is a possibility that the connecting member 222 and the metal film 27 come into contact.

<Manufacturing Method for Touch Panel 2>

A manufacturing method for the touch panel 2 will be schematically described below with reference to FIGS. 24A to 24D. FIGS. 24A to 24D are a cross-sectional view of FIG. 22 along the line A-A', and cross-sectional views of FIG. 20 along the lines C-C' and D-D'.

An even transparent conductive film is formed on the entire surface of the insulating substrate 10 by sputtering or CVD. A common metal film is formed by sputtering or vapor deposition over the transparent conductive film.

Figure 24A:
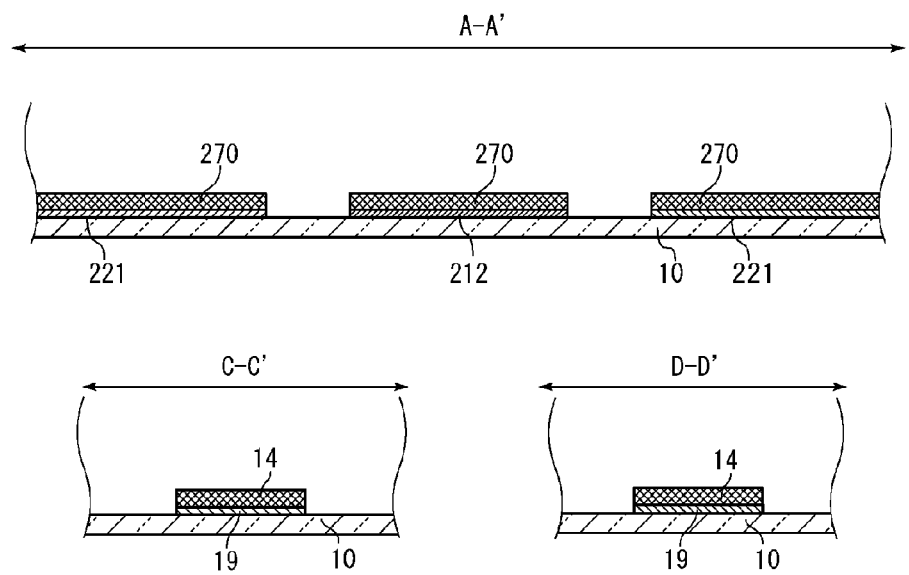
FIG. 24A shows cross-sectional views for describing a manufacturing method for the touch panel according to Embodiment 2 of the present invention.
Figure 24B:
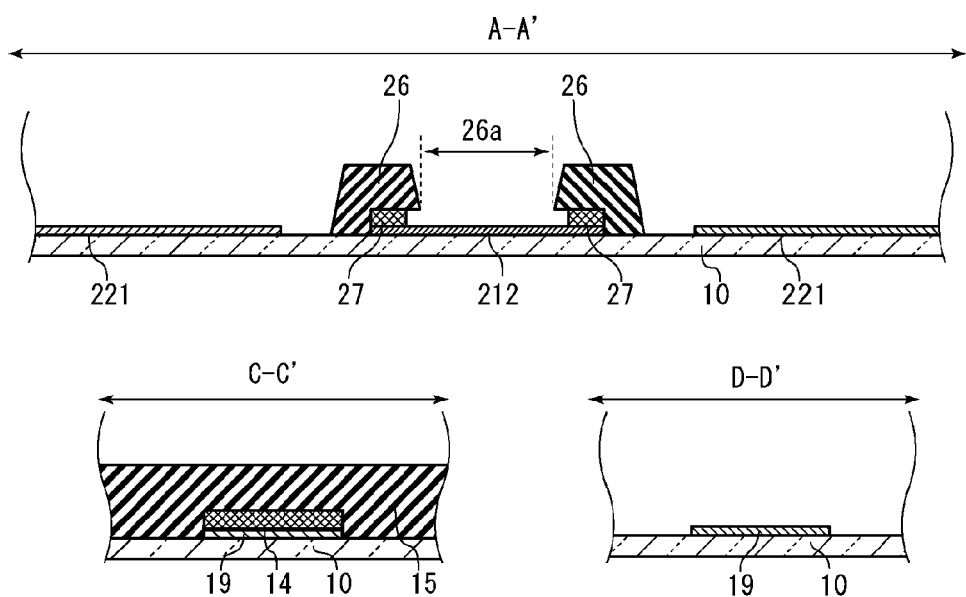
FIG. 24B shows cross-sectional views for describing a manufacturing method for the touch panel according to Embodiment 2 of the present invention.
Figure 24C:
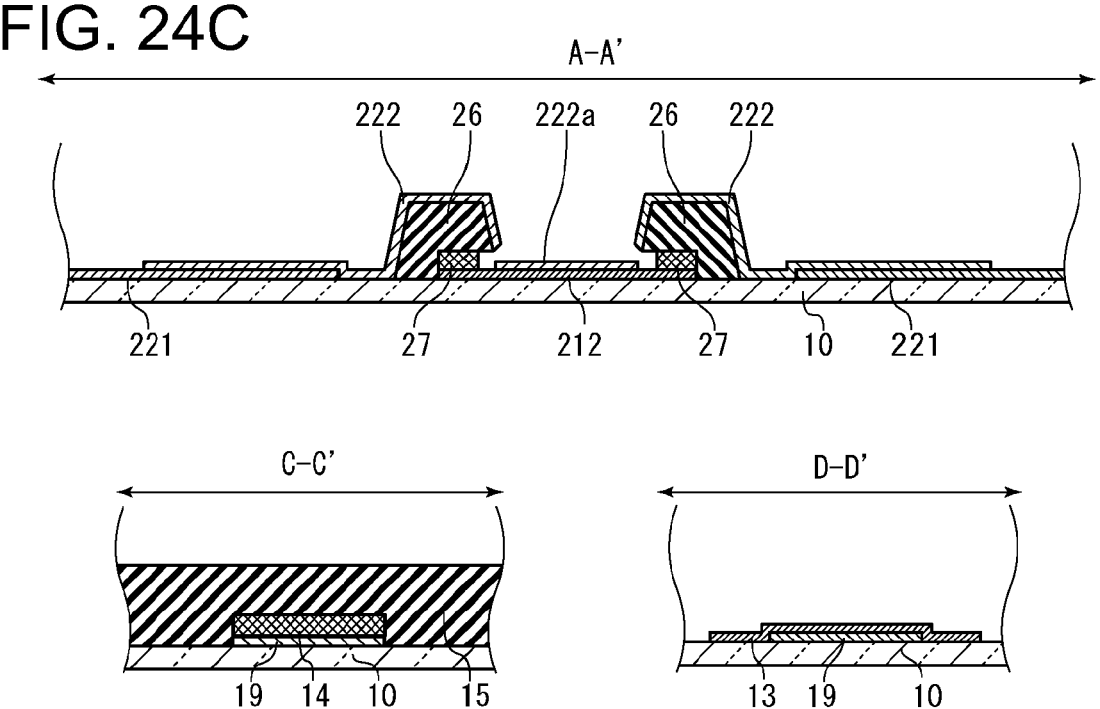
FIG. 24C shows cross-sectional views for describing a manufacturing method for the touch panel according to Embodiment 2 of the present invention.

The multilayer film including the transparent conductive film and the common metal film formed on the entire surface of the substrate 10 is patterned by photolithography. By patterning, the connecting member 212 of the X electrode 21, the island-shaped electrodes 221 of the Y electrode 22, the metal films 270, the wiring lines 14, and the conductive film 19 are formed (refer to FIG. 24A). Also, while not shown in FIG. 24A, island-shaped electrodes 211 of the X electrodes 21, the ground wiring line 141, and the conductive film 191 (refer to FIG. 20) are also formed in this patterning step.

The island-shaped electrodes 211 of the X electrodes 21 and the metal films 270 are patterned by the same mask, and thus, are formed into the same shape in the same positions in a plan view. This similarly applies to the connecting members 212 of the X electrodes 21 and the metal films 270, the island-shaped electrodes 221 of the Y electrodes 22 and the metal films 270, the conductive films 19 and the wiring lines 14, and the conductive film 191 and the ground wiring line 141.

After patterning is completed, annealing is performed at a temperature of 200 to 250° C. As a result of annealing, the transparent conductive film (island-shaped electrodes 211 and 221, connecting members 212, and conductive films 19 and 191), which had been amorphous, is made to be polycrystalline.

Next, the insulating films 15 and 26 are formed. Like the touch panel 1, the insulating films 15 and 26 may be made of photoresist or of an inorganic film. At this time, the contact holes 15a in the insulating film 15 and the openings 26a in the insulating film 26 are formed at the same time.

Next, the metal films 270, the wiring lines 24, and the like are etched with the insulating films 15 and 26 as masks. As a result, the metal films 27 are formed (refer to FIG. 24B). At this time, it is preferable to perform side etching as in the touch panel 1. By performing side etching, the edge face of the metal film 27 is located further to the inside than the edge face of the insulating film 26 by the length d2. Similarly, the size of each of the openings in the metal film 27 is greater than the size of each of the openings 26a of the insulating film 26, and the inner wall face of the opening of the metal film 27 is further to the outside than the inner wall face of the opening 26a of the insulating film 26 by the length d2.

Next, an even transparent conductive film is formed on the entire surface of the insulating substrate 10 by sputtering or CVD. The connecting members 222 and the terminals 13 are formed by patterning by photolithography (refer to FIG. 24C).

Figure 24D:
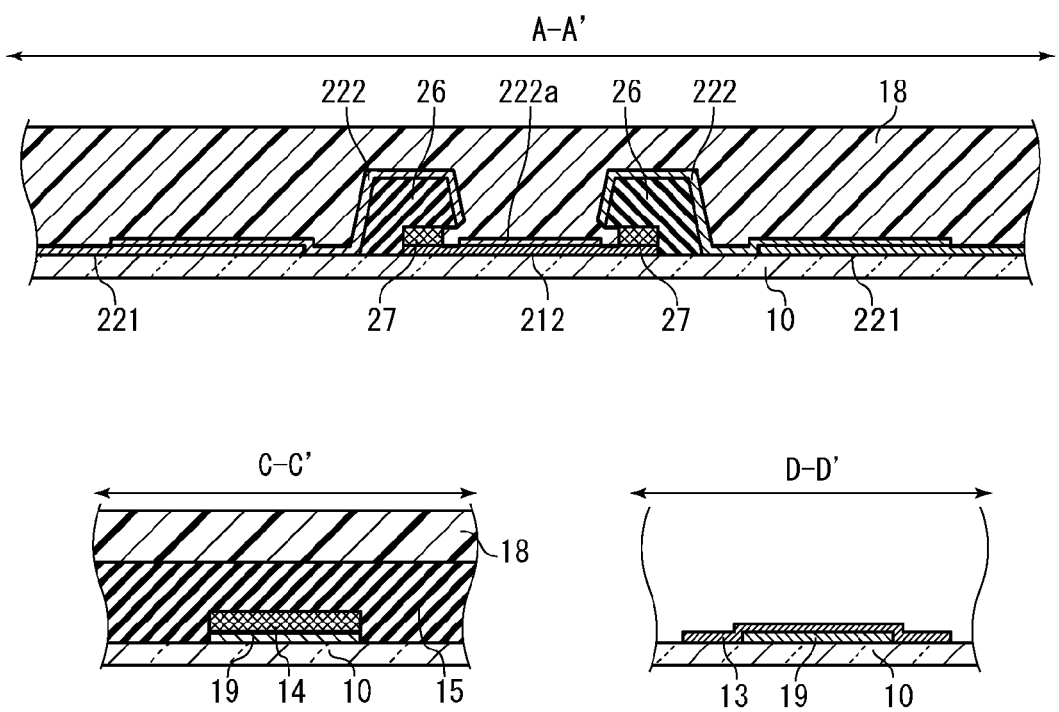
FIG. 24D shows cross-sectional views for describing a manufacturing method for the touch panel according to Embodiment 2 of the present invention.

Lastly, the protective film 18 is evenly formed by a spin coater or slit coater (refer to FIG. 24D). At this time, portions of the terminals 13 are covered by masks such that the protective film 18 is not formed thereon.

The configuration of the touch panel 2 and the manufacturing method according to Embodiment 2 of the present invention have been described above.

The touch panel 2 of the present embodiment can be manufactured by a process including four masks, which includes the following steps: patterning (FIG. 24A) to form the island-shaped electrodes 211 and 221, the connecting members 212, the conductive films 19 and 191, the metal film 270, the wiring lines 14, and the ground wiring line 141; patterning (FIG. 24B) to form the insulating films 15 and 26, the metal films 27, and the like; patterning (FIG. 24C) to form the connecting members 222 and the terminals 13; and patterning (FIG. 24D) to form the protective film 18.

The metal films 27 are formed on the connecting members 212 only where they are covered by the insulating films 26. The area of the metal films 27 is made even smaller by forming a plurality of openings 26a in the insulating films 26. Also, the area of the metal films 27 can be made even smaller than that of the insulating films 26 by performing side etching.

As described above, in the present embodiment also, it is possible to manufacture the touch panel with fewer steps and such that the electrode patterns in the touch panel are difficult to see.

<Embodiment 3>

Figure 25:
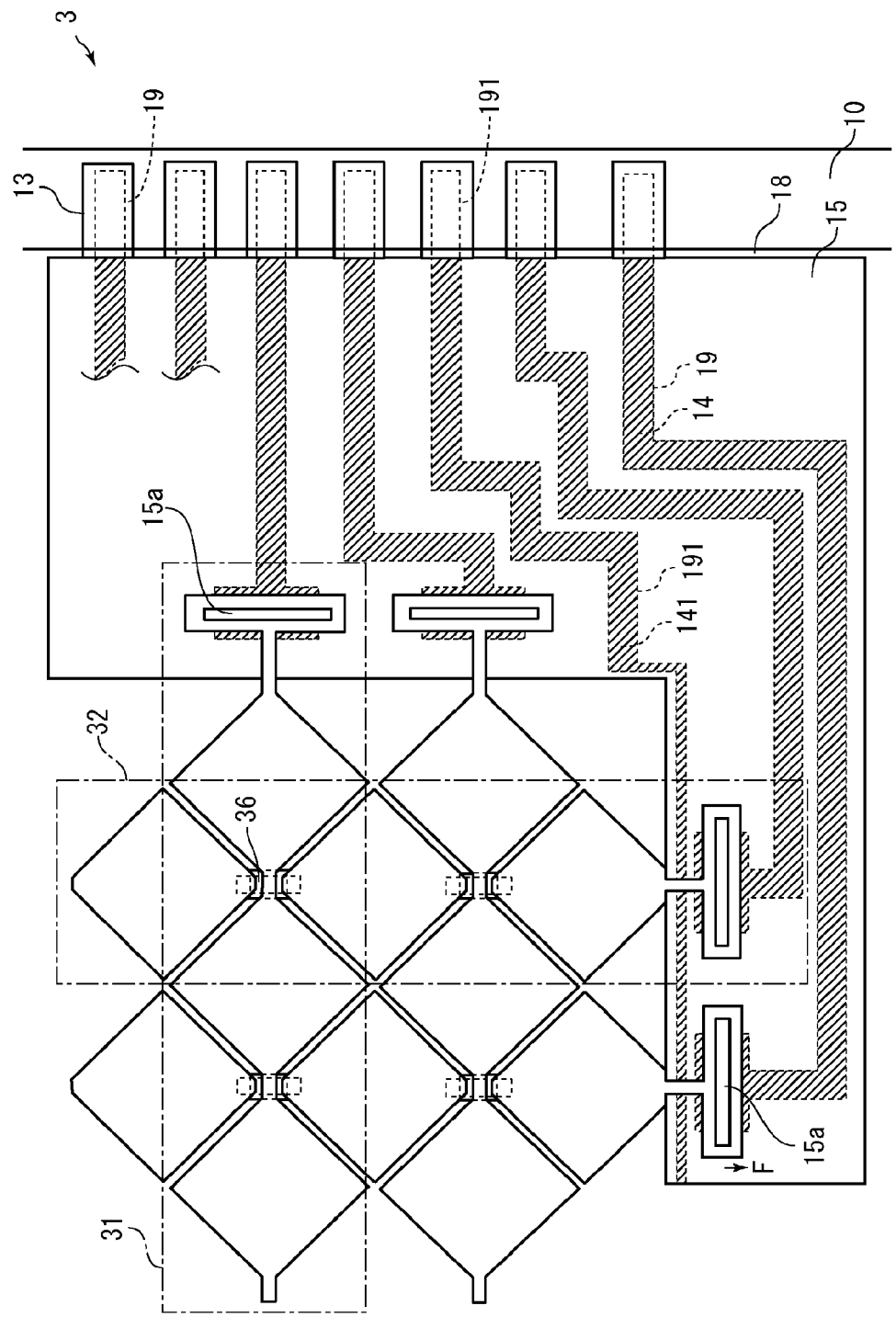
FIG. 25 is a plan view that shows a schematic configuration of a touch panel according to Embodiment 3 of the present invention.

FIG. 25 is a plan view that shows a schematic configuration of a touch panel 3 according to Embodiment 3 of the present invention. The touch panel 3 includes a substrate 10, X electrodes 31, Y electrodes 32, terminals 13, wiring lines 14, a ground wiring line 141, insulating films 15 and 36, conductive films 19 and 191, and a protective film 18. The touch panel 3 differs from the touch panel 1 in the configuration of the X electrodes, the Y electrodes, and the intersections between the X electrodes and Y electrodes. In FIG. 25, the wiring lines 14 and the ground wiring line 141 are depicted with a hatching pattern for ease of viewing.

Figure 26:
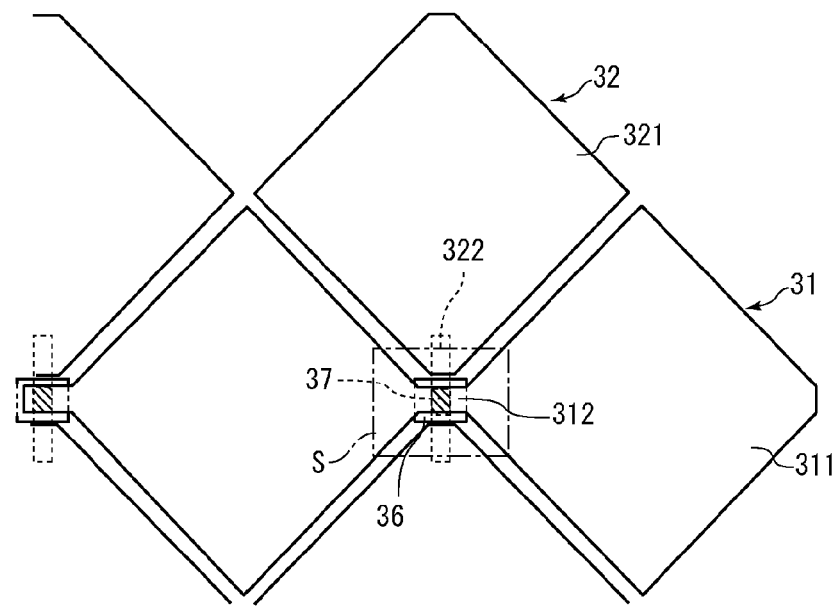
FIG. 26 shows a magnified view of the vicinity of X electrodes and Y electrodes from a configuration of the touch panel according to Embodiment 3 of the present invention.
Figure 27:
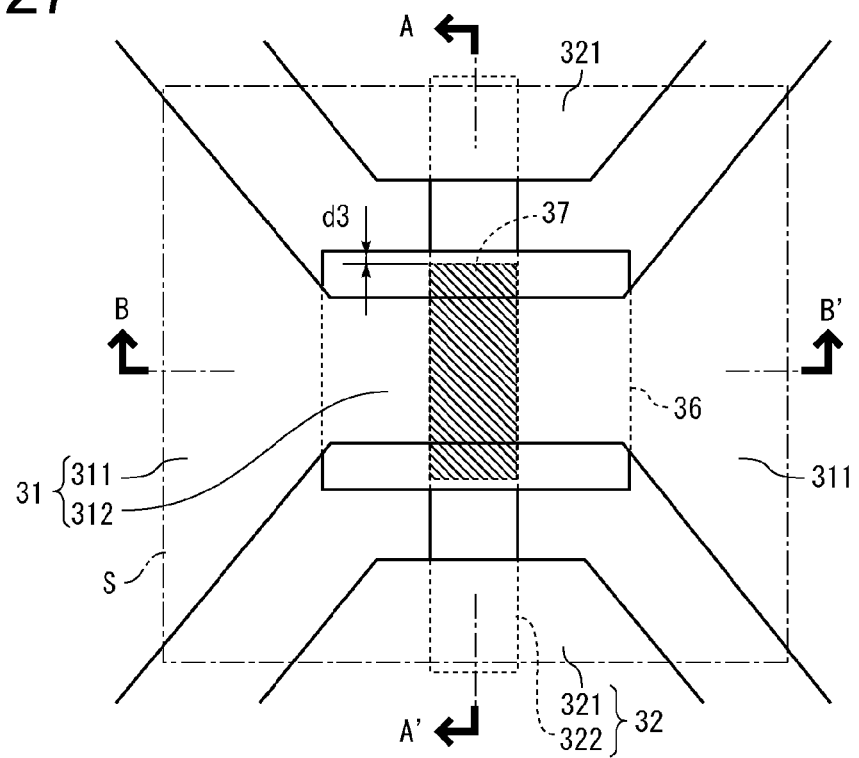
FIG. 27 shows a further magnified view of a portion where an X electrode and a Y electrode intersect (rectangular region S in FIG. 26).
Figure 28:
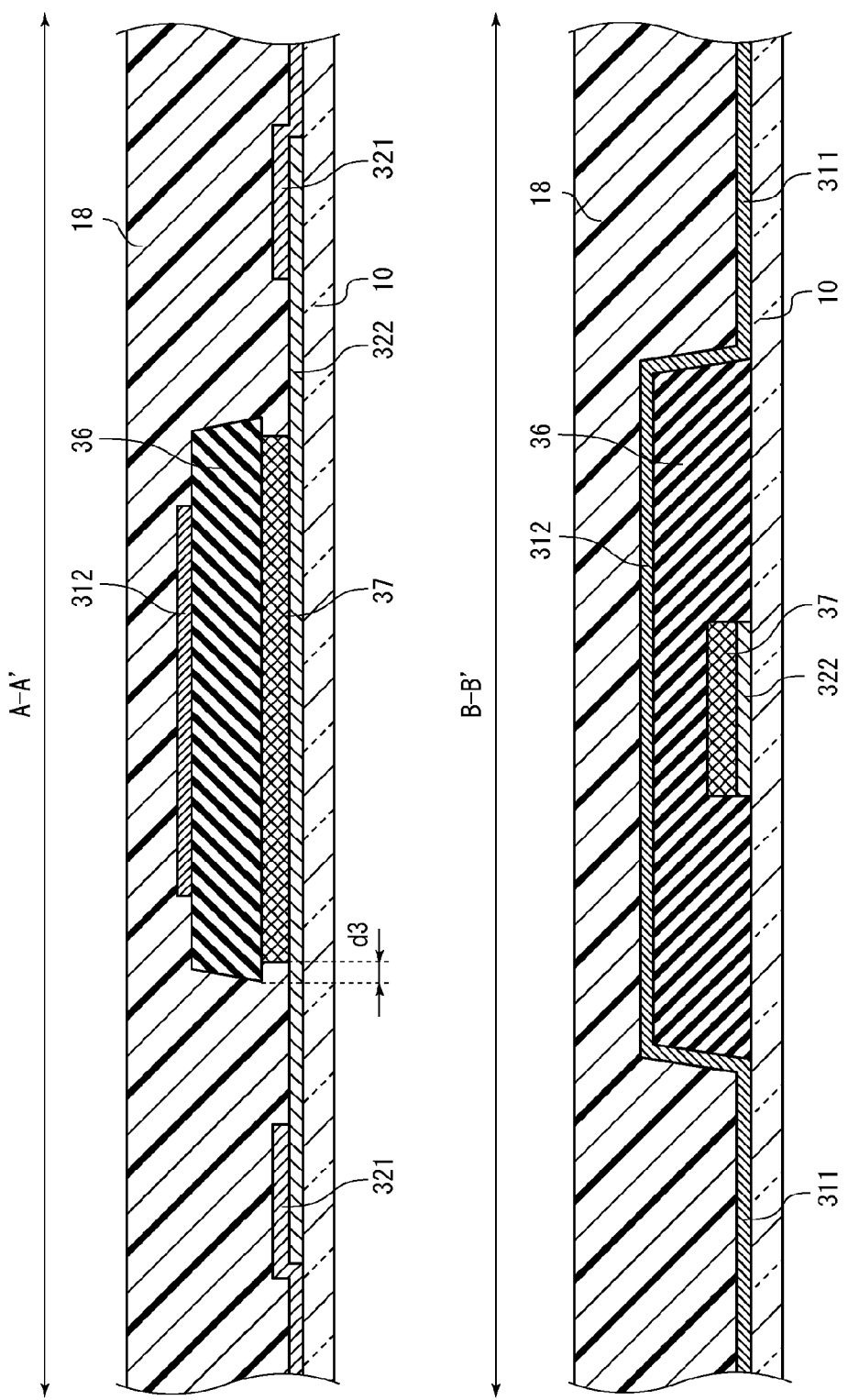
FIG. 28 shows cross-sectional views of FIG. 27 along the lines A-A' and B-B'.

FIG. 26 shows a magnified view of a vicinity of an X electrode 31 and a Y electrode 32 from the configuration of the touch panel 3. FIG. 27 shows a further magnified view of a portion where the X electrode 31 and the Y electrode 32 intersect (rectangular region S in FIG. 26). FIG. 28 shows cross-sectional views of FIG. 27 along the lines A-A' and B-B'. The touch panel 3 has a metal film 37, similar to the touch panel 1. In FIGS. 26 and 27, the metal film 37 is schematically shown with a hatching pattern.

Like the X electrode 11 of the touch panel 1, the X electrode 31 of the touch panel 3 includes a plurality of island-shaped electrodes 311 and connecting members 312 that connect adjacent island-shaped electrodes 311. The Y electrodes 32 include a plurality of island-shaped electrodes 321, and connecting members 322 that connect adjacent island-shaped electrodes 321.

As shown in FIG. 27, where the connecting members 312 of the X electrodes 31 and the connecting members 322 of the Y electrodes 32 intersect, the insulating films 36 are formed therebetween. Also, a metal film 37 is formed where the connecting member 322 of the Y electrode 32 and the insulating film 36 overlap in a plan view. More specifically, an edge face of the metal film 37 is further to the inside than an edge face of the insulating film 36 by a length d3.

As shown in FIG. 28, the metal films 27 are formed on the connecting members 322 and below the insulating films 36.

Unlike the touch panel 1, in the touch panel 3, there are no openings in the insulating film 36. Thus, there are no openings formed in the metal film 37 either.

In the present embodiment also, it is possible to manufacture the touch panel with fewer steps and such that the electrode patterns in the touch panel are difficult to see.

In the touch panel 3 of the present embodiment, no openings are formed in the insulating film 36 and the connecting member 312 is not split, and thus, compared to the touch panel 1, the electrical resistance of the connecting member 312 can be reduced. However, the area of the metal film 37 is large due to the lack of openings. Thus, in the configuration of the touch panel 3, it is preferable that side etching be performed to a greater extent than in the touch panel 1 and that the length d3 be as great as possible.

<Embodiment 4>

Figure 29:
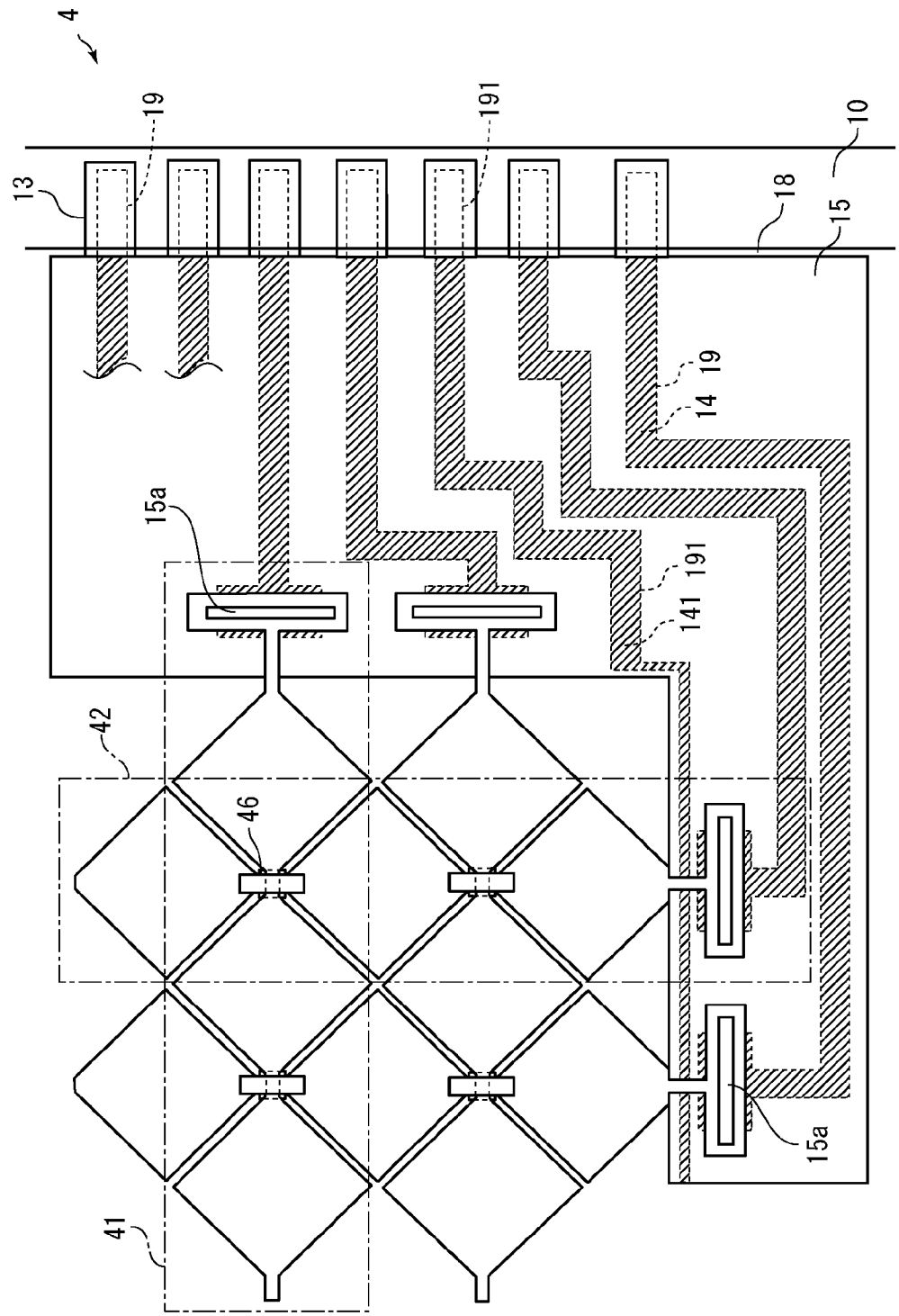
FIG. 29 is a plan view that shows a schematic configuration of a touch panel according to Embodiment 4 of the present invention.

FIG. 29 is a plan view that shows a schematic configuration of a touch panel 4 according to Embodiment 4 of the present invention. The touch panel 4 includes a substrate 10, X electrodes 41, Y electrodes 42, terminals 13, wiring lines 14, a ground wiring line 141, insulating films 15 and 46, conductive films 19 and 191, and a protective film 18. The touch panel 4 differs from the touch panel 1 in the configuration of the X electrodes, the Y electrodes, and the intersections between the X electrodes and Y electrodes. In FIG. 29, the wiring lines 14 and the ground wiring line 141 are depicted with a hatching pattern for ease of viewing.

Figure 30:
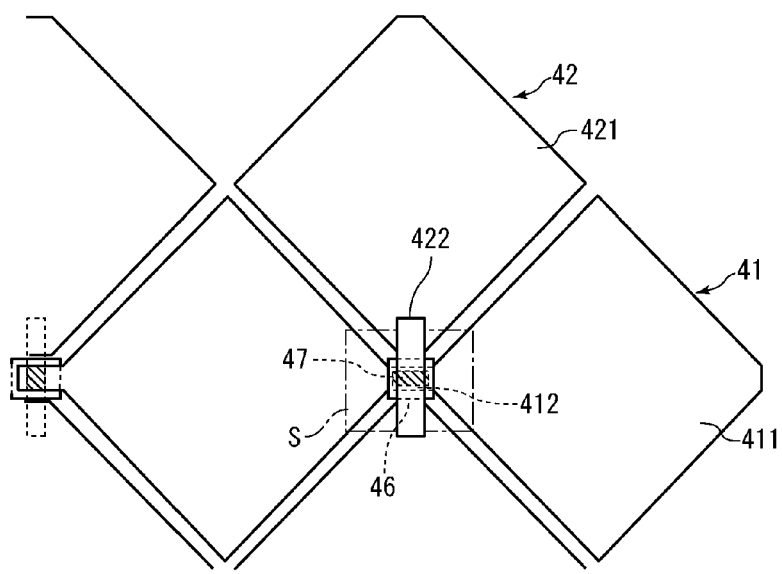
FIG. 30 shows a magnified view of the vicinity of X electrodes and Y electrodes from a configuration of the touch panel according to Embodiment 4 of the present invention.
Figure 31:
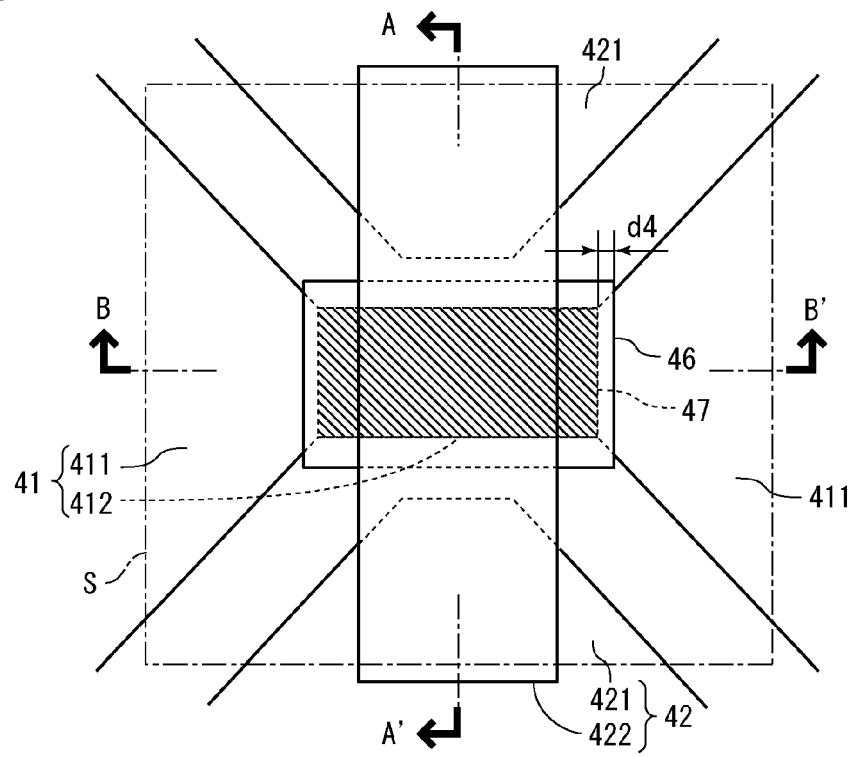
FIG. 31 shows a further magnified view of a portion where an X electrode and a Y electrode intersect (rectangular region S in FIG. 30).
Figure 32:
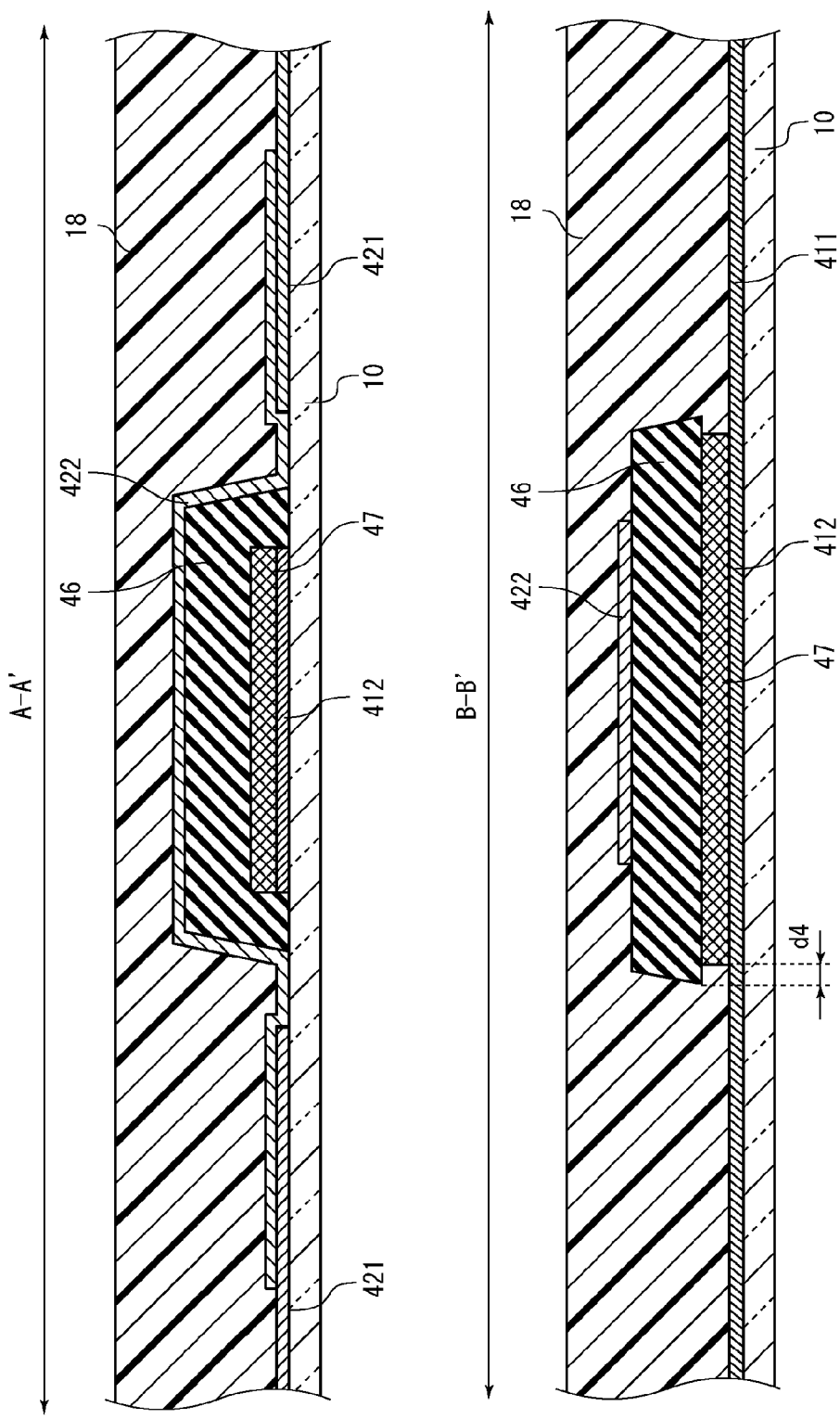
FIG. 32 shows cross-sectional views of FIG. 31 along the lines A-A' and B-B'.

FIG. 30 shows a magnified view of a vicinity of an X electrode 41 and a Y electrode 42 from the configuration of the touch panel 4. FIG. 31 shows a further magnified view of a portion where the X electrode 41 and the Y electrode 42 intersect (rectangular region S in FIG. 30). FIG. 32 shows cross-sectional views of FIG. 30 along the lines A-A' and B-B'. The touch panel 4 has a metal film 47, similar to the touch panel 1. In FIGS. 30 and 31, the metal film 47 is schematically shown with a hatching pattern.

Like the X electrode 11 of the touch panel 1, the X electrode 41 of the touch panel 4 includes a plurality of island-shaped electrodes 411 and connecting members 412 that connect adjacent island-shaped electrodes 411. The Y electrodes 42 include a plurality of island-shaped electrodes 421, and connecting members 422 that connect adjacent island-shaped electrodes 421.

As shown in FIG. 31, where the connecting members 412 of the X electrodes 41 and the connecting members 422 of the Y electrodes 42 intersect, the insulating films 46 are formed therebetween. Also, a metal film 47 is formed where the connecting member 412 of the X electrode 41 and the insulating film 46 overlap in a plan view. More specifically, an edge face of the metal film 47 is further to the inside than an edge face of the insulating film 46 by a length d4.

As shown in FIG. 32, the metal films 47 are formed on the connecting members 412 and below the insulating films 46.

Unlike the touch panel 2, in the touch panel 4, there are no openings in the insulating film 46. Thus, there are no openings formed in the metal film 47 either.

In the present embodiment also, it is possible to manufacture the touch panel with fewer steps and such that the electrode patterns in the touch panel are difficult to see.

In the touch panel 4 of the present embodiment, no openings are formed in the insulating film 46 and the connecting member 422 is not split, and thus, compared to the touch panel 2, the electrical resistance of the connecting member 422 can be reduced. On the other hand, the area of the metal film 47 is large due to the lack of openings. Thus, in the configuration of the touch panel 4, it is preferable that side etching be performed to a greater extent than in the touch panel 2 and that the length d4 be as great as possible.

<Other Embodiments>

The embodiments of the present invention were described above, but the present invention is not limited to the embodiments above, and various modifications are possible within the scope of the present invention.

In the present embodiment, the insulating films are formed in a rectangular shape in a plan view, for example. However, the insulating film may be polygonal or have an indefinite shape.

INDUSTRIAL APPLICABILITY

The present invention can be applied to the industry of capacitive touch panels and to display devices equipped with touch panels.

The invention claimed is:

1. A touch panel, comprising:
    an insulating substrate;
    first island-shaped electrodes formed on the substrate and arranged along one direction;
    second island-shaped electrodes formed on the substrate and arranged along a direction that intersects with said one direction along which the first electrodes are arranged;
    a first connecting member that connects the first island-shaped electrodes;
    a metal film formed on the first connecting member;
    an insulating film formed so as to cover an entirety of the metal film; and
    a second connecting member connecting the second island-shaped electrodes over the insulating film,
    wherein the first island-shaped electrodes, the second island-shaped electrodes, the first connecting member, and the second connecting member are made of transparent conductive films.

2. The touch panel according to claim 1, wherein an edge of the metal film is located further to an inner side of the insulating film than an edge of the insulating film.

3. The touch panel according to claim 2, wherein the edge of the metal film is located at least 0.1 µm further to an inner side of the insulating film than an edge of the insulating film.

4. The touch panel according to claim 1, wherein the insulating film has an opening.

5. The touch panel according to claim 4,
    wherein the metal film is greater in thickness than the second connecting member, and
    wherein the second connecting member has regions separated by the opening in the insulating film.

6. The touch panel according to claim 1, wherein the insulating film is made of a black resin.

7. The touch panel according to claim 1, wherein the metal film includes layers of molybdenum-niobium, aluminum, and molybdenum-niobium.

8. The touch panel according to claim 1, further comprising wiring lines made of the same material as the metal film.

9. A display device equipped with a touch panel, comprising:
    a display device that can display images; and
    the touch panel according to claim 1.

10. A method of manufacturing a touch panel, comprising:
    forming a first transparent conductive film on an insulating substrate;
    forming a metal film on the first transparent conductive film;
    patterning the first transparent conductive film and the metal film;
    forming an insulating film so as to cover respective portions of the substrate and the metal film;
    etching at least portions of the metal film not covered by the insulating film;
    forming a second transparent conductive film so as to cover the substrate, the first transparent conductive film, the metal film, and the insulating film; and
    patterning the second transparent conductive film.

* * * * *